United States Patent
Katta et al.

(10) Patent No.: US 11,417,328 B1
(45) Date of Patent: Aug. 16, 2022

(54) AUTONOMOUSLY MOTILE DEVICE WITH SPEECH COMMANDS

(71) Applicant: Amazon Technologies, Inc., Seattle, WA (US)

(72) Inventors: Anil Kumar Katta, Bellevue, WA (US); Amy Marie Whitberg, San Francisco, CA (US); Xiaoqing Jing, San Jose, CA (US); Swetha Bijoy, Bothell, WA (US); Swati S. Rao, Sunnyvale, CA (US); Robert Franklin Ebert, Los Altos Hills, CA (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 16/707,523

(22) Filed: Dec. 9, 2019

(51) Int. Cl.
| | |
|---|---|
| G10L 15/08 | (2006.01) |
| G10L 15/22 | (2006.01) |
| G10L 15/30 | (2013.01) |
| G06F 3/01 | (2006.01) |
| G06T 7/70 | (2017.01) |

(52) U.S. Cl.
CPC .............. *G10L 15/22* (2013.01); *G06F 3/017* (2013.01); *G06T 7/70* (2017.01); *G10L 15/08* (2013.01); *G10L 15/30* (2013.01); *G10L 2015/088* (2013.01); *G10L 2015/223* (2013.01)

(58) Field of Classification Search
CPC ... G10L 15/22; G10L 15/30; G10L 2015/088; G10L 2015/223; G10L 15/08
See application file for complete search history.

(56) References Cited

U.S. PATENT DOCUMENTS

| | | | |
|---|---|---|---|
| 8,165,886 B1* | 4/2012 | Gagnon | G10L 15/19 704/275 |
| 9,260,244 B1* | 2/2016 | Cohn | G06Q 10/08 |
| 9,698,999 B2* | 7/2017 | Mutagi | H04L 12/2829 |
| 10,896,675 B1* | 1/2021 | Lam | B25J 13/003 |
| 11,277,814 B2* | 3/2022 | Karampatsis | H04W 68/005 |
| 2004/0128114 A1* | 7/2004 | Yamazaki | G06F 13/385 702/190 |
| 2013/0066468 A1* | 3/2013 | Choi | B25J 11/008 700/258 |
| 2013/0166279 A1* | 6/2013 | Dines | G10L 15/063 704/8 |
| 2016/0350589 A1* | 12/2016 | Chiu | B25J 13/00 |
| 2017/0185081 A1* | 6/2017 | Steele | G05D 1/0016 |
| 2018/0001483 A1* | 1/2018 | Song | B25J 13/006 |
| 2018/0043952 A1* | 2/2018 | Ellerman | B62D 15/00 |

(Continued)

FOREIGN PATENT DOCUMENTS

JP    6936656 B2 * 9/2021

*Primary Examiner* — Daniel C Washburn
*Assistant Examiner* — Oluwadamilola M Ogunbiyi
(74) *Attorney, Agent, or Firm* — Pierce Atwood LLP

(57) ABSTRACT

An autonomously motile device may be controlled by speech received by a user device. A first speech-processing system associated with the user device may determine that audio data includes a representation of a command; a second speech-processing system associated with the autonomously motile device may determine that the command should be executed by the autonomously motile device. A network connection is established between the user device and the autonomously motile device, and a device manager authorizes execution of the command.

20 Claims, 26 Drawing Sheets

(56) References Cited

U.S. PATENT DOCUMENTS

| | | | |
|---|---|---|---|
| 2018/0068514 A1* | 3/2018 | Li | G07F 9/002 |
| 2018/0074508 A1* | 3/2018 | Kleiner | G05D 1/0274 |
| 2018/0281180 A1* | 10/2018 | Yamamoto | B25J 9/1664 |
| 2018/0354129 A1* | 12/2018 | Yuzawa | B25J 9/1689 |
| 2019/0043502 A1* | 2/2019 | Chen | H05B 47/12 |
| 2019/0102377 A1* | 4/2019 | Neuman | G06F 3/04883 |
| 2019/0107833 A1* | 4/2019 | Song | G05D 1/0246 |
| 2019/0152065 A1* | 5/2019 | Song | B25J 13/003 |
| 2020/0004235 A1* | 1/2020 | Nocon | A63H 30/04 |
| 2020/0184972 A1* | 6/2020 | Kolavennu | G10L 13/00 |
| 2020/0216086 A1* | 7/2020 | Lenke | G05D 1/0088 |
| 2020/0246977 A1* | 8/2020 | Swietojanski | G06F 3/167 |
| 2021/0043205 A1* | 2/2021 | Lee | G10L 15/22 |
| 2021/0046599 A1* | 2/2021 | Morimura | B23Q 7/046 |
| 2021/0088784 A1* | 3/2021 | Whitmire | G06K 9/6273 |
| 2021/0233647 A1* | 7/2021 | Jenoski | G02B 21/365 |
| 2021/0360386 A1* | 11/2021 | Grafulla-González | H04W 8/265 |
| 2021/0385423 A1* | 12/2021 | Oh | H04N 13/161 |
| 2022/0005303 A1* | 1/2022 | Kim | G06V 20/52 |
| 2022/0053583 A1* | 2/2022 | Peng | H04W 8/22 |

* cited by examiner

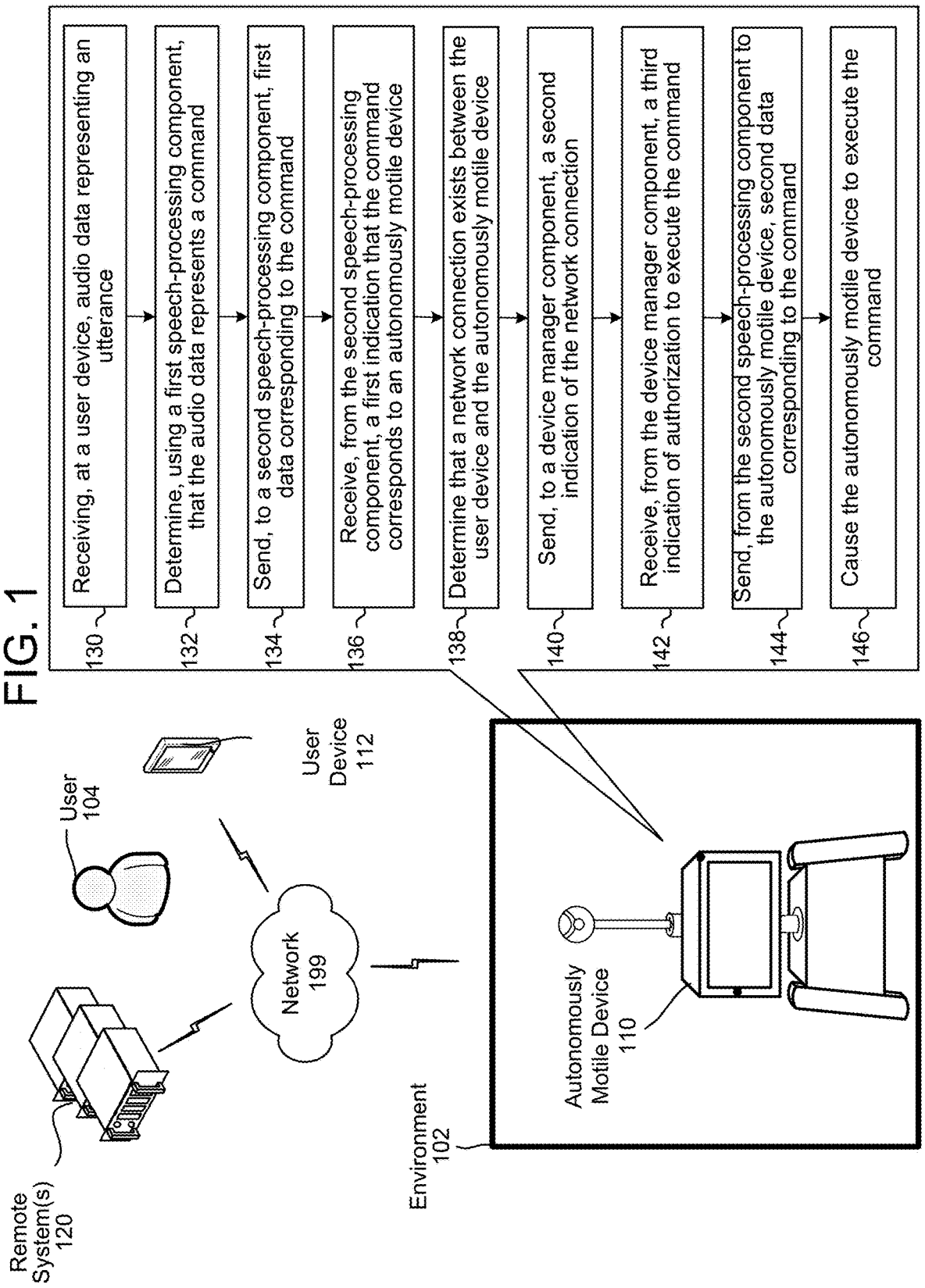

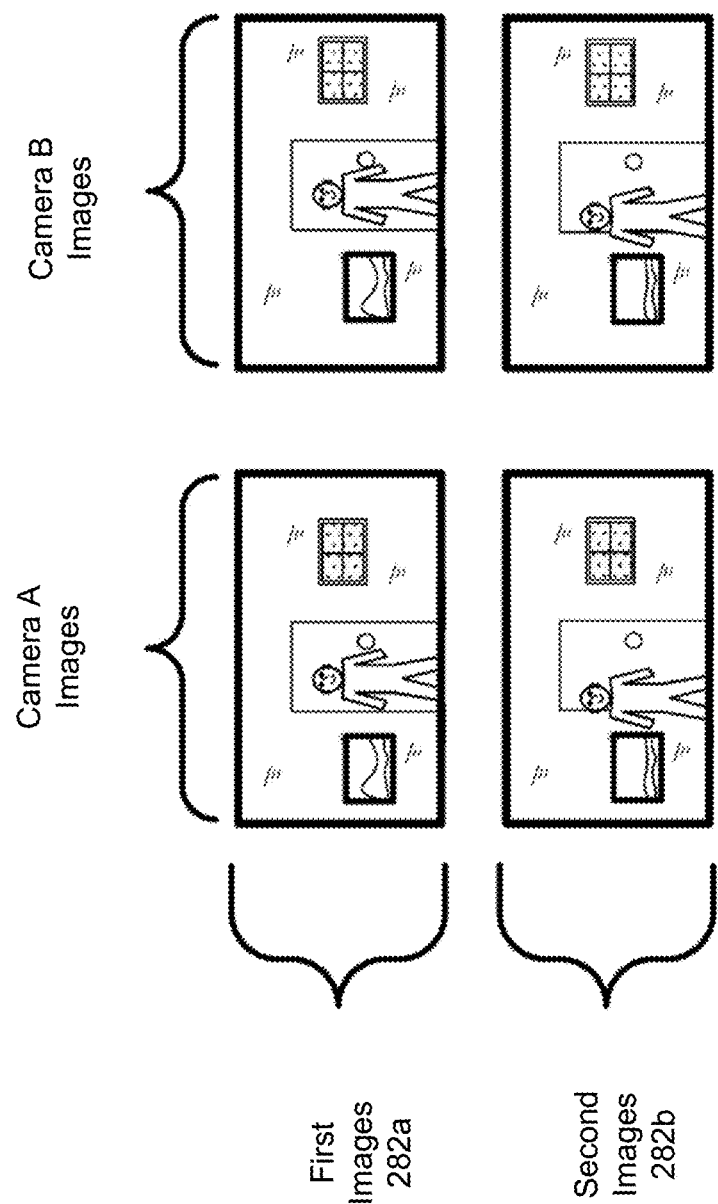

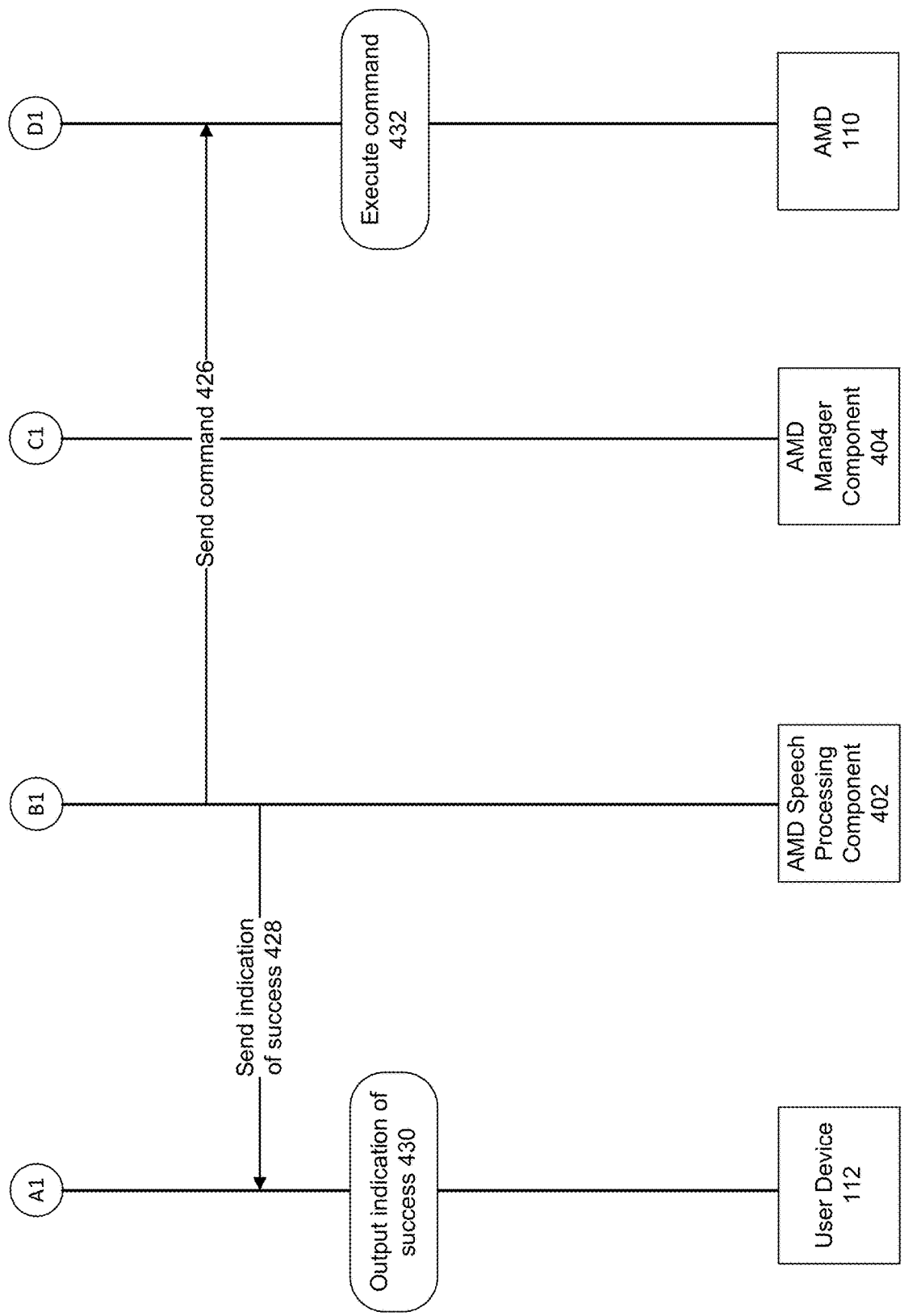

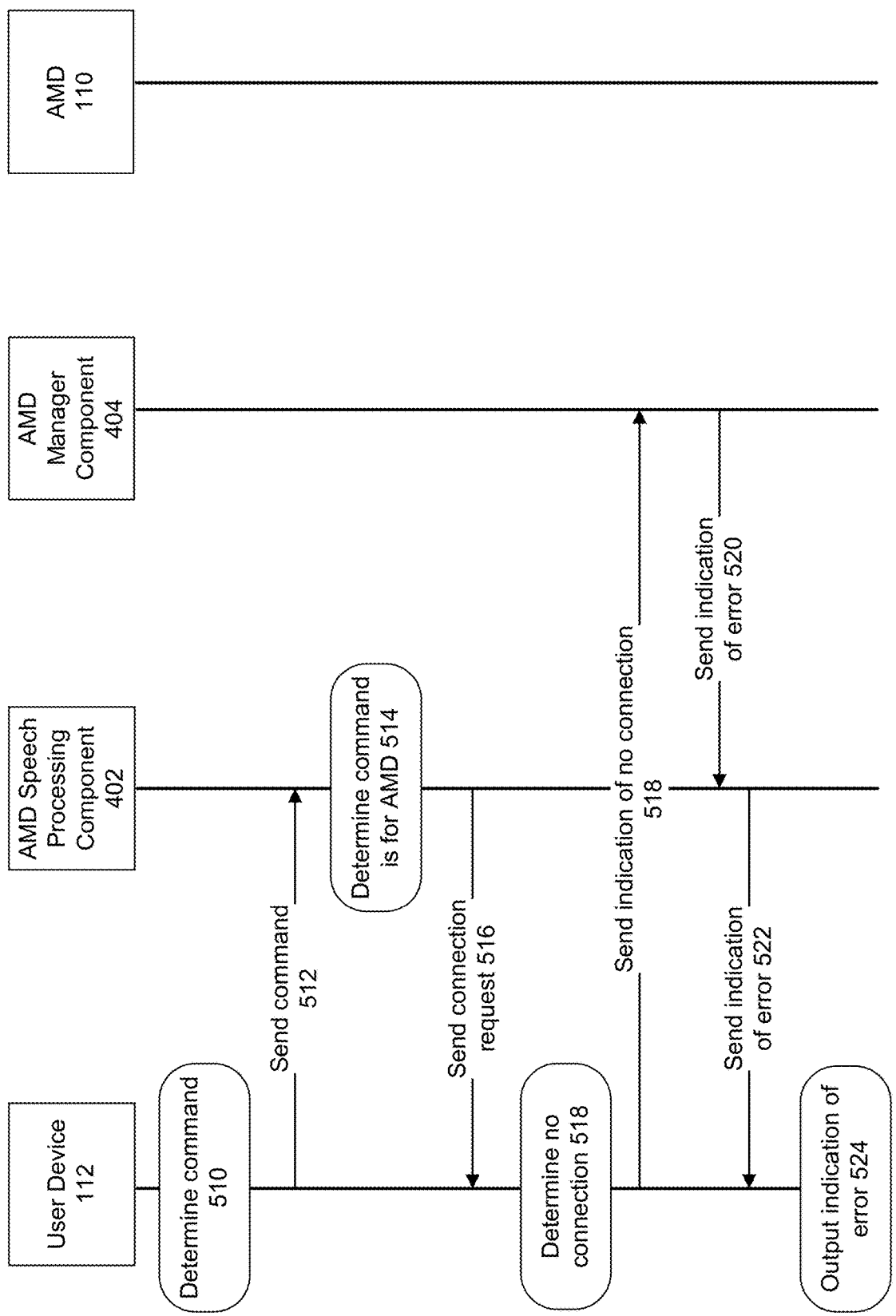

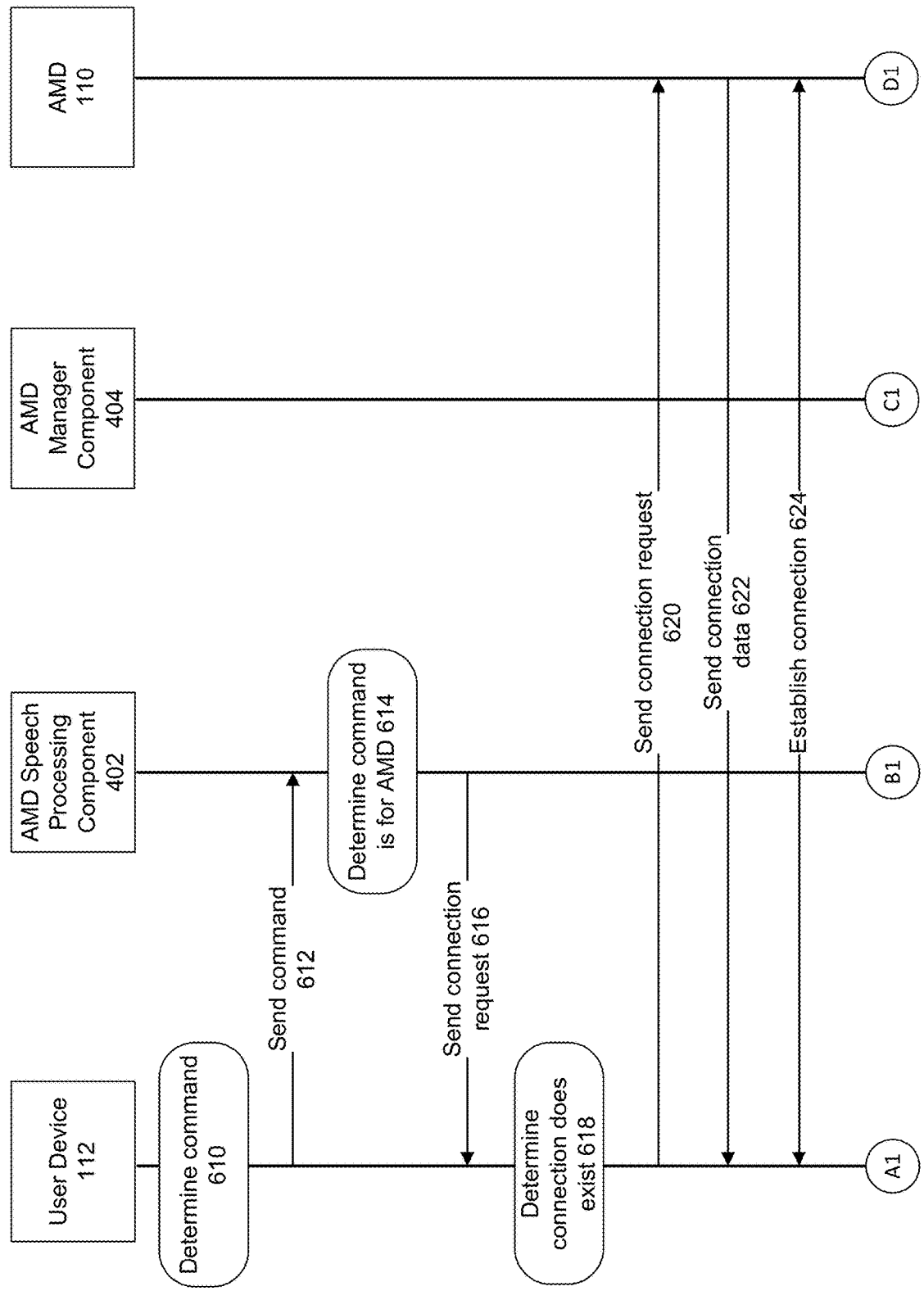

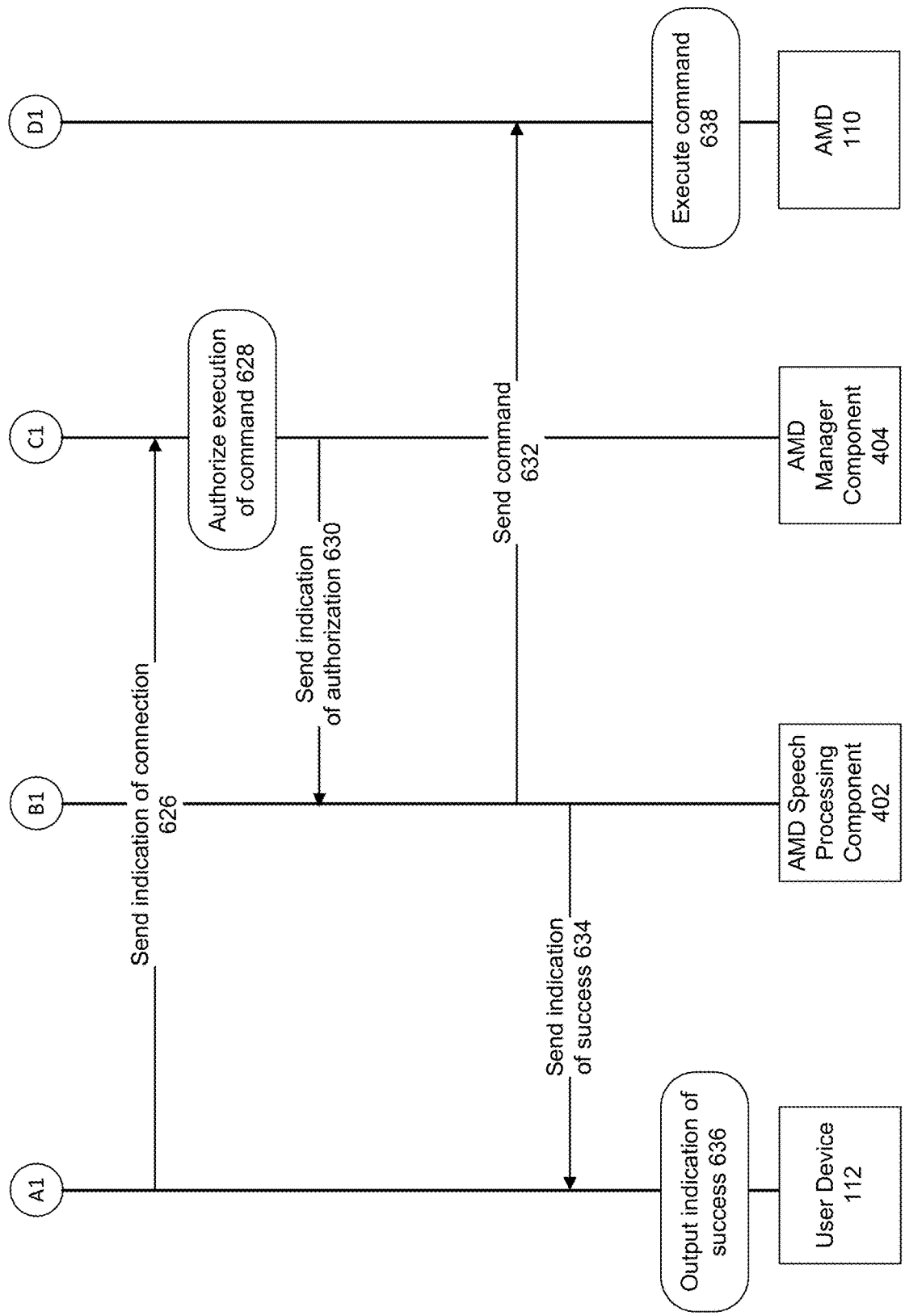

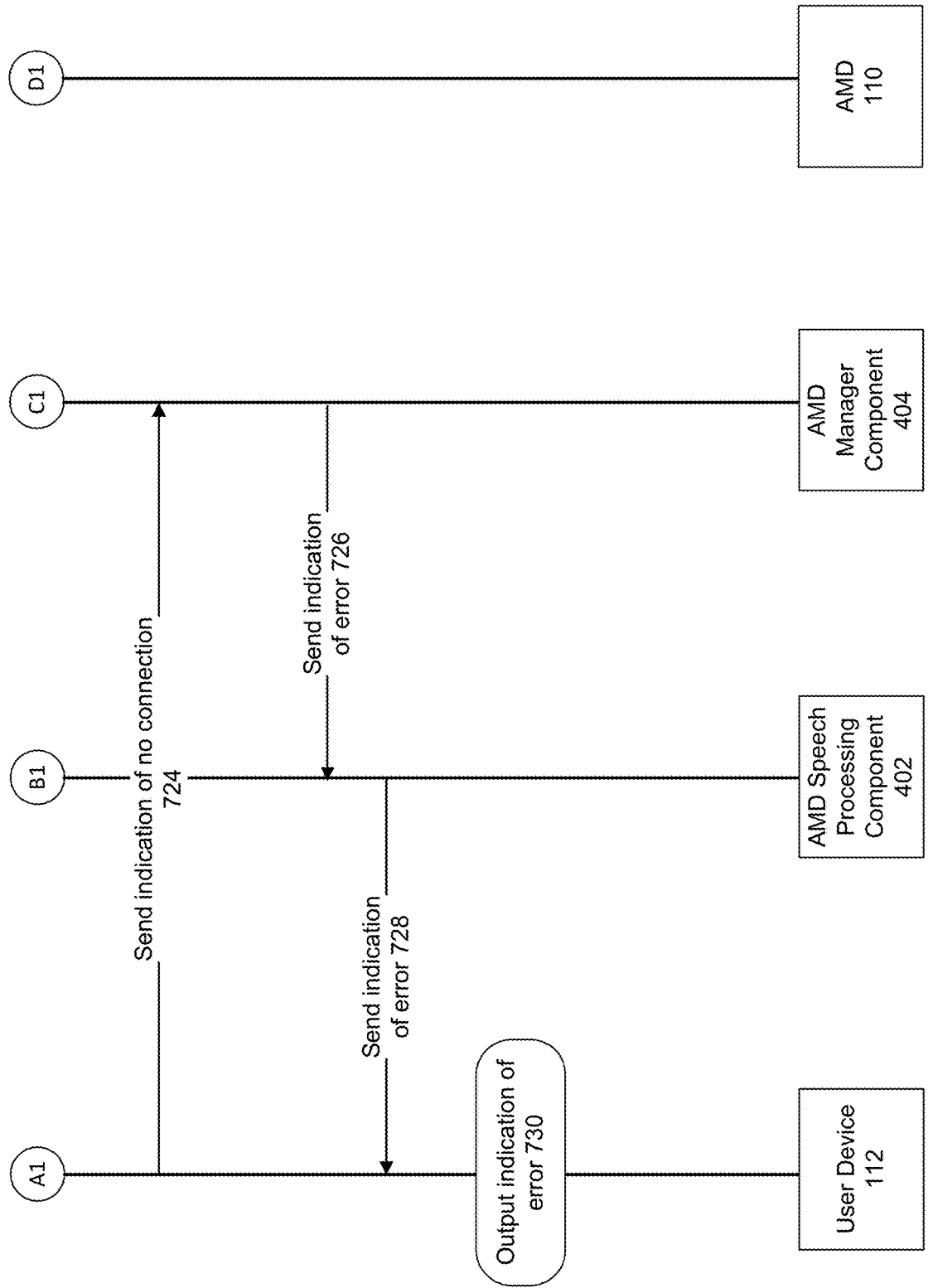

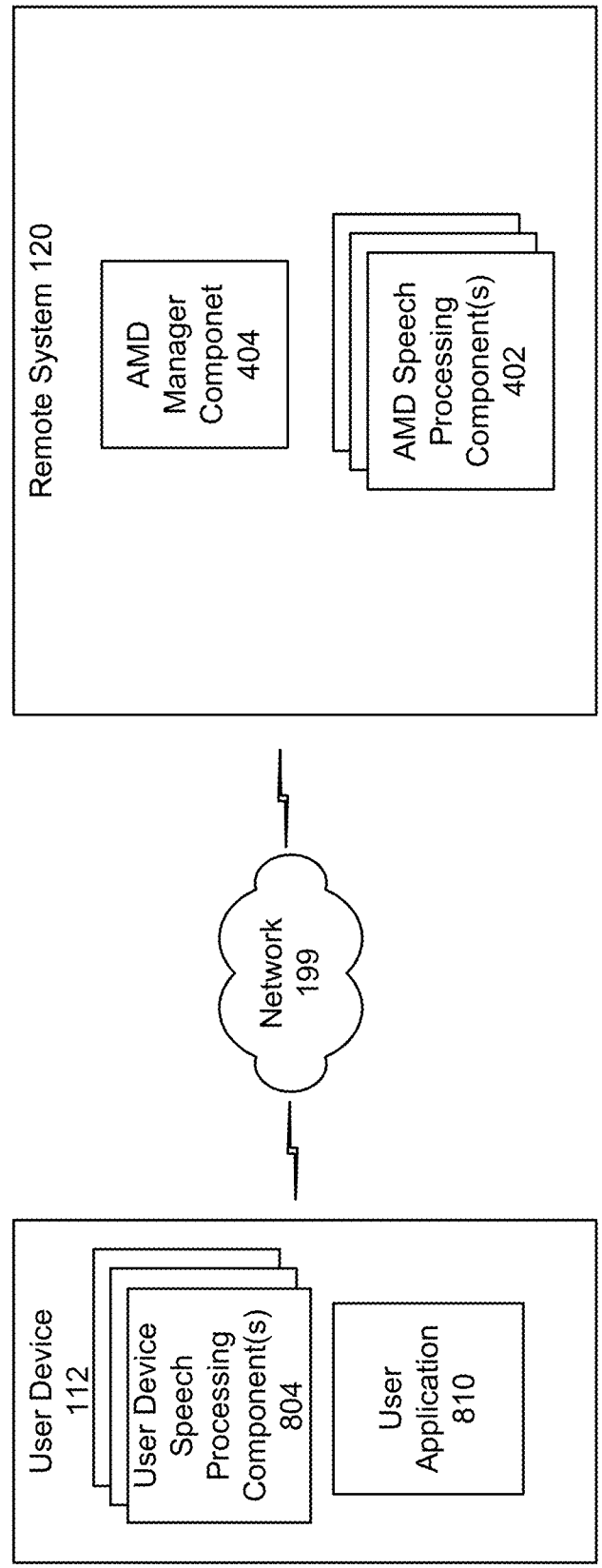

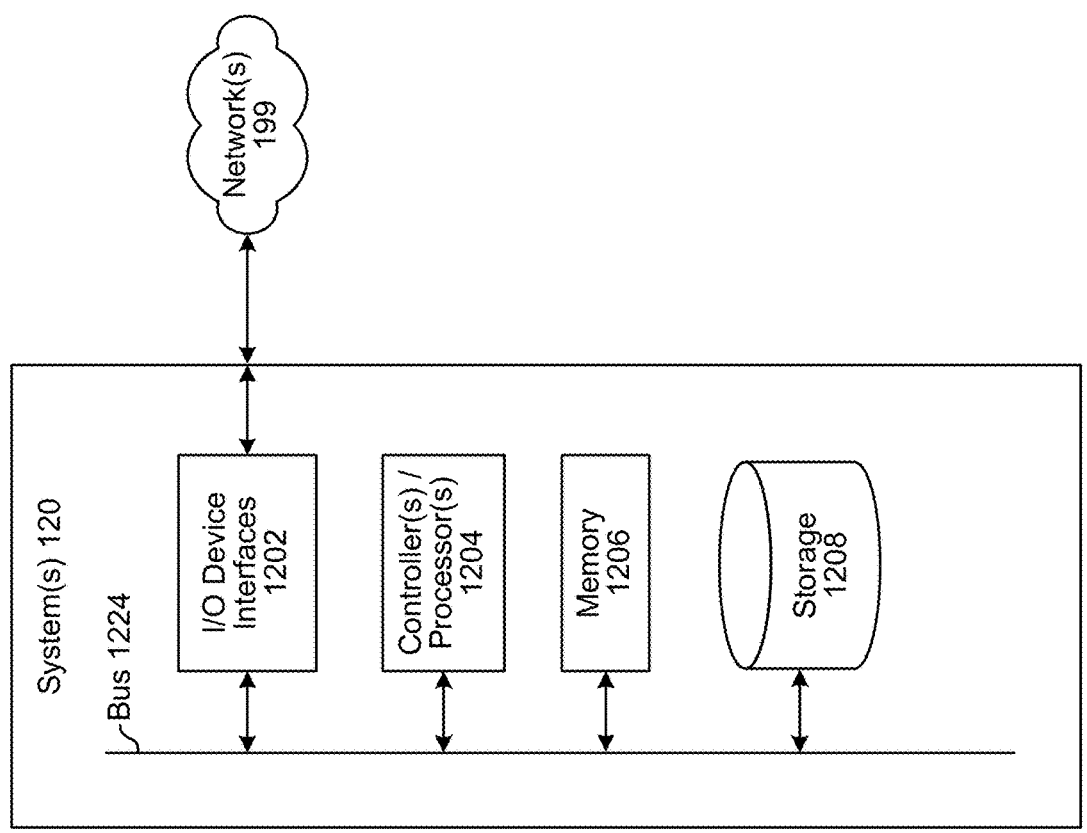

AUTONOMOUSLY MOTILE DEVICE WITH SPEECH COMMANDS

BACKGROUND

An autonomously motile device may be capable of moving or performing other actions within an environment. Speech-recognition processing, combined with natural-language understanding processing, may enable speech-based user control and output of the autonomously motile device to perform tasks based on a user's spoken commands. The combination of speech-recognition processing and natural-language understanding processing is referred to herein as speech processing. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system and method for controlling an autonomously motile device using speech according to embodiments of the present disclosure.

FIGS. 2E and 2F illustrate images captured by an autonomously motile device in an environment according to embodiments of the present disclosure.

FIGS. 4A, 4B, 5, 6A, 6B, 7A, and 7B illustrate speech control of an autonomously motile device using a user device in accordance with embodiments of the present disclosure.

FIGS. 8A and 8B illustrate user devices and remote systems for speech control of an autonomously motile device in accordance with embodiments of the present disclosure.

FIG. 12 illustrates a block diagram of a server according to embodiments of the present disclosure.

DETAILED DESCRIPTION

Figure 2A:
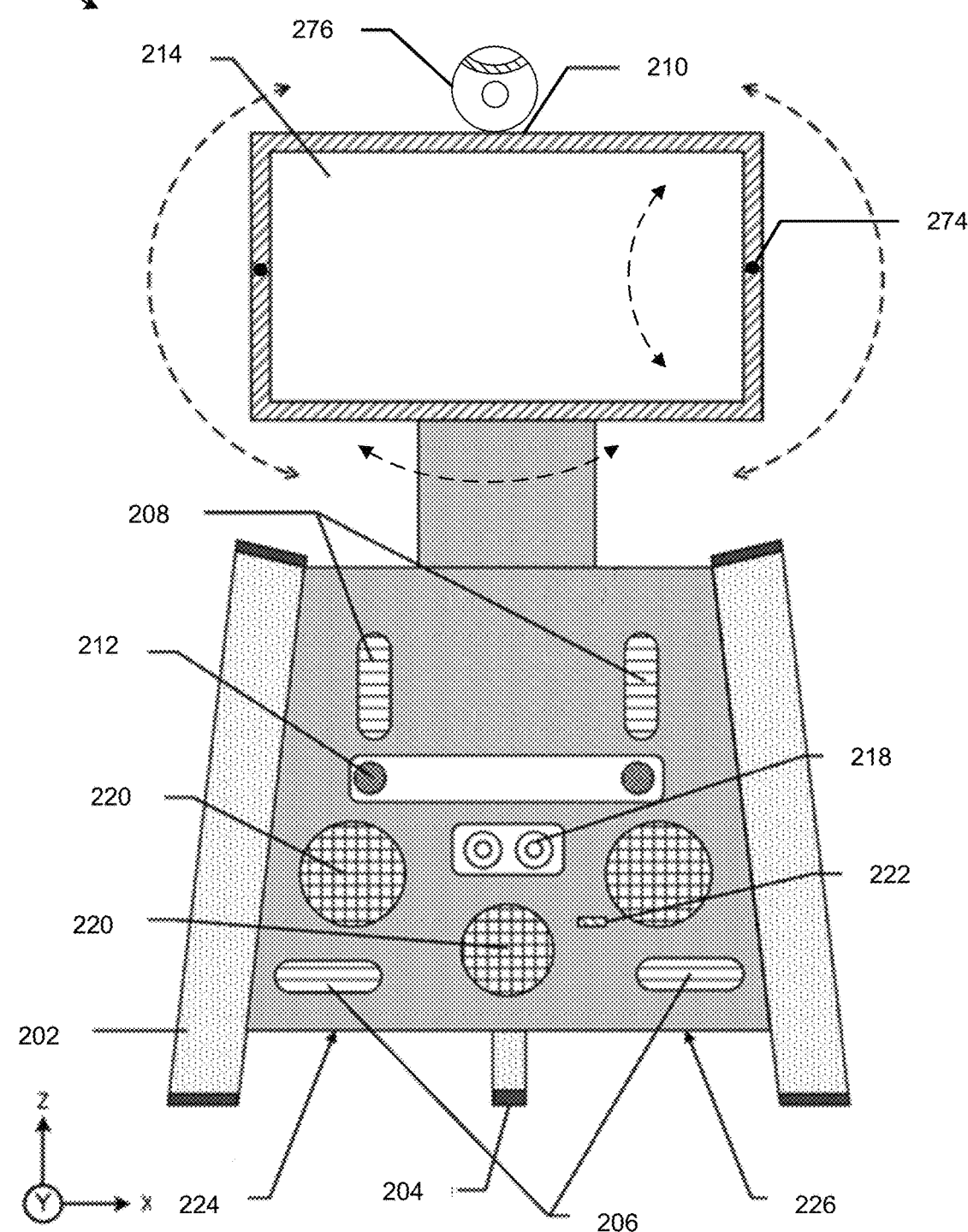
FIGS. 2A, 2B, and 2C illustrate views of an autonomously motile device according to embodiments of the present disclosure.

An autonomously motile device—e.g., a robot, herein abbreviated to "AMD"—may be capable of performing actions in an environment in response to commands of a user. Such actions may include movement; this movement may include one or more of movement of a component of the autonomously motile device, such as movement of a display screen or camera of the autonomously motile device; movement of the autonomously motile device at a position in the environment, such as rotation of the autonomously motile device at the position; and/or movement of the autonomously motile device within the environment, such as movement from a first position in the environment to a second position in the environment. Other actions may include outputting audio using one or more loudspeakers of the autonomously motile device, capturing audio using one or more microphones of the autonomously motile device, and/or displaying images or video using one or more display screens of the autonomously motile device. The present disclosure is not, however, limited to any particular actions of the autonomously motile device.

The autonomously motile device may be associated with a speech-processing component configured for processing audio data, which may include a representation of an utterance of a user, to identify a command represented by the utterance and act in response to the command. The utterance may be, for example, "go to the kitchen"; the speech-processing component may determine that the command corresponds to a directive for the autonomously motile device to move in its environment such that it is disposed in a room in the environment designated as the "kitchen." This speech-processing component may be disposed on the autonomously motile device itself or on a different system, such a remote system.

The speech-processing component may include components for automatic speech recognition and/or natural-language understanding. Automatic speech recognition (ASR) is a field of computer science, artificial intelligence, and linguistics involving transforming audio data associated with speech into text representative of that speech. Natural language understanding (NLU) is a field of computer science, artificial intelligence, and linguistics concerned with enabling computers to derive meaning from input data representing natural language (e.g., text data and/or audio data). ASR and NLU are often used together as part of a speech-processing system.

The autonomously motile device and/or user device may be configured to perform the speech processing. In other embodiments, a distributed computing environment may be used to perform some or all of the speech processing. An example distributed environment may include the autonomously motile device, user device, and a remote device; the autonomously motile device and/or user device may send audio data representing the speech to the remote device, which then performs some or all of the speech processing. A command represented in the audio data may then be executed by a combination of the remote system, the autonomously motile device, and/or the user device.

The autonomously motile device, user device, and/or remote system may be configured to process audio data upon a user speaking a particular word, phrase, and/or nonspeech sound—referred to collectively herein as a "wakeword"— to, e.g., send and/or process the audio data in expectation of the user speaking further words and/or sounds representing a command. Some components of the autonomously motile device and/or user device, such as a voice-activity detection (VAD) component (discussed in greater detail below) may continually listen for speech; upon detection of speech, the VAD component may cause the processing of the audio data using other components, such as a wakeword-detection component (also discussed in greater detail below). The wakeword may represent an indication for the autonomously motile device, user device, and/or remote system to perform further processing. For example, the autonomously motile device, user device, and/or remote system may be configured to detect a wakeword or other input and then process any subsequent audio following the wakeword or other input (and, in some embodiments, some amount of pre-wakeword audio) to detect any commands in the subsequent audio.

As an example, a wakeword may include a name by which a user refers to a user device, a name of a different device, a name of an assistant, and/or a name of a skill. Thus, if the wakeword is "Alexa," a user may command the autonomously motile device, user device, and/or remote system to play music by saying "Alexa, play some music now." A first wakeword may be associated with the user device, while a second wakeword, such as "Robot," may be associated with the autonomously motile device. The autonomously motile device and/or user device may continually receive and process audio to detect the wakeword. Upon the user device recognizing the wakeword "Alexa," the autonomously motile device and/or user device may process the subsequent audio (in this example, "play some music") to determine a command. Additionally or alternatively, the autonomously motile device and/or user device may send audio data representing the speech to the remote system to perform speech processing on that audio to determine the command for execution.

The autonomously motile device may, in addition to receiving commands directly from a user (via, for example, audio captured by a microphone of the autonomously motile device) may instead or in addition receive commands via a user device, such as a smartphone or tablet computer. If, for example, the autonomously motile device is disposed in a location in the environment different from that of a user (in, e.g., a different room in the environment), the user may issue commands to the autonomously motile device via the user device such as a smartphone to, e.g., summon the autonomously motile device, cause the autonomously motile device to capture image data, and/or cause the autonomously motile device to output audio. The user device may communicate directly with the autonomously motile device via a local network, such as a Wi-Fi network, and/or communicate with the autonomously motile device via a remote system via a wide-area network, such as the Internet.

In various embodiments, the user device may be associated with a second speech-processing system. The first speech-processing system of the autonomously motile device may be associated with at least some commands or actions specific to the autonomously motile device, such as movement in the environment. The second speech-processing system of the user device may not be associated with such commands and may instead be associated with non-motile-device-specific commands, e.g., general commands, such as commands to output information like weather forecasts, requests for information, music, video, or other such output.

Some commands, such as movement commands, may be associated with only the autonomously motile device. The user device may be incapable of acting in accordance with these commands (e.g., the user device may be incapable of movement) and thus only the autonomously motile device is capable of acting in accordance with these commands. Other commands may be associated with only the user device; these commands may include commands to output particular audio and/or video and/or to control other devices in the environment, such as a network-connected electrical outlet. Still other commands may be associated with both the autonomously motile device and the user device; in other words, both the user device and the autonomously motile device are capable of acting in accordance with these commands. If both devices are so capable, the user device and/or autonomously motile device may determine that only one device is to act in accordance with the commands. In other embodiments, both devices act in accordance with the commands.

FIG. 1 illustrates an environment 102 in which an autonomously motile device 110 is disposed. A user device 112 may be in communication with the autonomously motile device 110 via a network 199. The user device 112 may be disposed in the environment 102 or may be disposed in a different environment (e.g., a user 104 of the user device 112 may be in the same room or house as the autonomously motile device 110 or may be in a different room or house). The user device 112 and/or autonomously motile device 110 may further be in communication with one or more remote systems 120 via the network 199 (and/or other network). Although the figures and discussion of the present disclosure illustrate certain operational steps of a method in a particular order, the steps described may be performed in a different order (as well as certain steps removed or added) without departing from the intent of the disclosure.

The autonomously motile device 110 may be capable of autonomous motion using one or motors powering one or more wheels, treads, robotic limbs, wings, propellers, or similar actuators, but the present disclosure is not limited to particular method of autonomous movement/motion. The autonomously motile device 110 may further include one or more display screens for displaying information to a user and/or receiving touch (or other) input from a user. The autonomously motile device 110 may further include a microphone array including one or more microphones and one or more loudspeakers; the microphone array may be used to receive audio data, such as an utterance represented by user audio, from the user. The utterance may be, for example, a command or request. The loudspeaker of autonomously motile device 110 may be used to output audio to the user, such as audio related to a response to command or audio related to response to a request.

The device 110 may further include one or more sensors; these sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110 may be, in some embodiments, a robotic assistant or "robot" that may move about a room or rooms to provide a user with requested information or services. In other embodiments, the device 110 is capable of rotation but not linear motion; the device 110 may be mounted or placed on a surface or floor, for example, and may rotate in place to face a user. The disclosure is not, however, limited to only these devices or components, and the device 110 may include additional components without departing from the disclosure.

In various embodiments, with reference to FIG. 1, audio data representing an utterance is received (130) at a user device. A first speech-processing component, determines (132) that the audio data represents a command and sends (134), to a second speech-processing component, first data corresponding to the command. A first indication is received (136) from the second speech-processing component that the command corresponds to an autonomously motile device. The user device determines (138) that a network connection exists between the user device and the autonomously motile device. The user device sends (140), to a device manager component, a second indication of the network connection and receives (142), from the device manager component, a third indication of authorization to execute the command. The second speech-processing component sends (144), to the autonomously motile device, second data corresponding to the command, and causes (146) the autonomously motile device to execute the command.

Figure 2B:
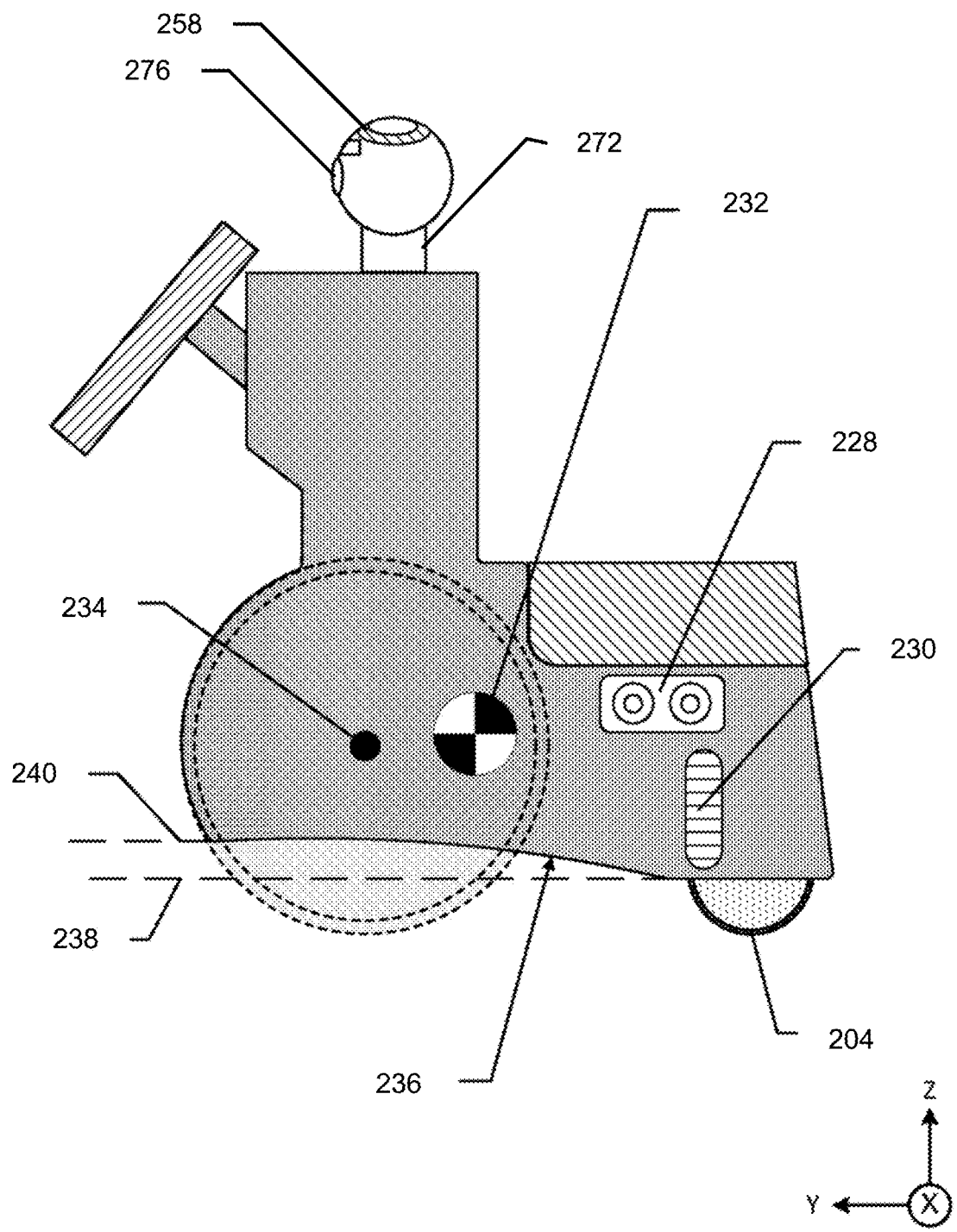
Figure 2C:
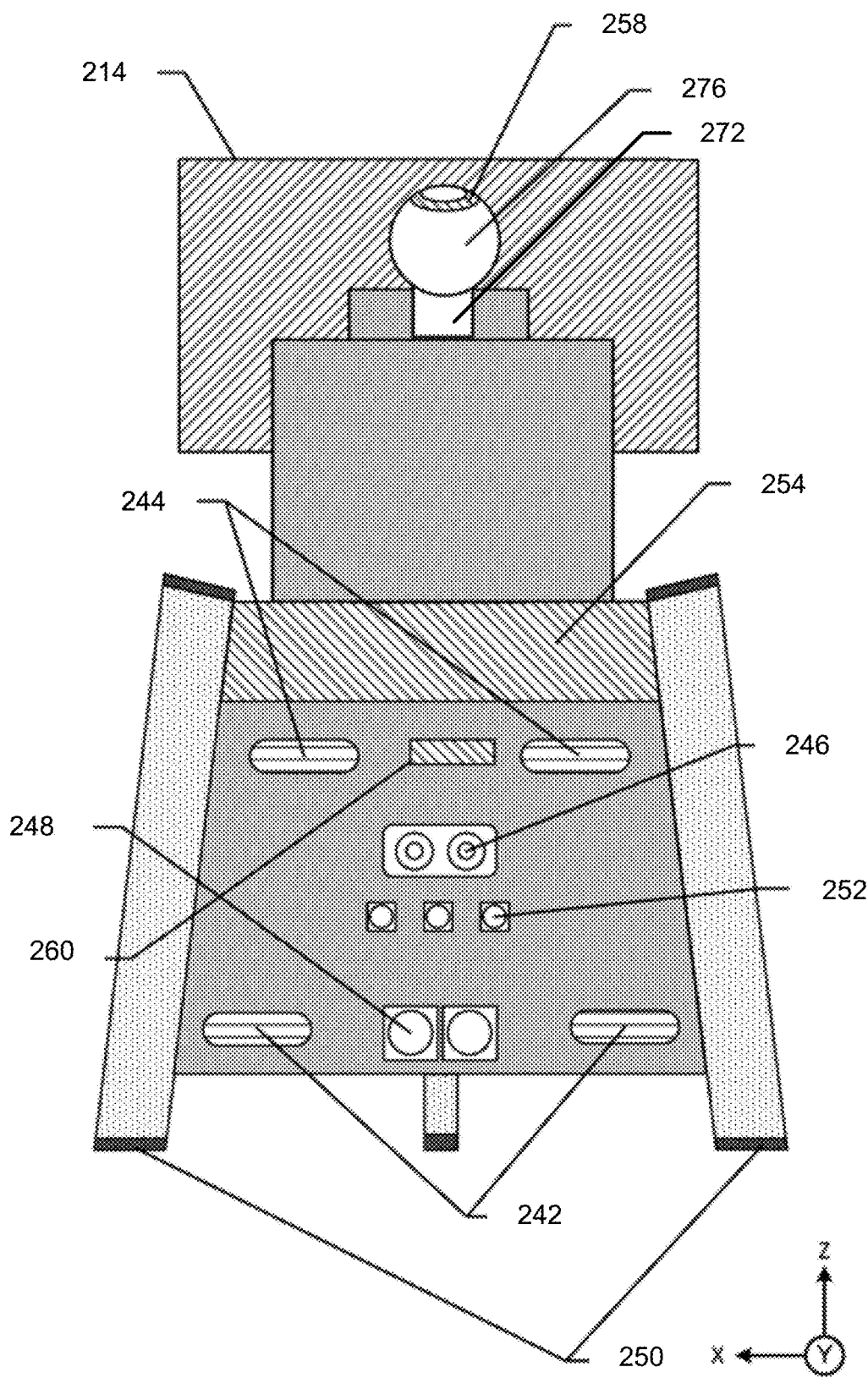

FIGS. 2A-2C illustrate an autonomously motile device 110 according to various embodiments of the present disclosure. Referring first to FIG. 2A, the device 110 includes wheels 202 disposed on left and right sides of a lower structure. The wheels 202 may be canted inwards toward an upper structure. In other embodiments, however, the wheels 202 may be mounted vertically. A caster 204 (i.e., a smaller wheel) may disposed along a midline of the device 110. The front section of the device 110 may include a variety of external sensors. A first set of optical sensors 206 may be disposed along the lower portion of the front, and a second set of optical sensors 208 may be disposed along an upper portion of the front. A microphone array 210 may be disposed on a top surface of the device 110; the microphone array 210 may, however, be disposed on any surface of the device 110.

The device 110 may have one or more cameras mounted on one or more surfaces of the device 110. The cameras may be capable of capturing image data; this image data may be still pictures or moving video. The cameras may be capable of capturing wavelengths of light outside of the spectrum visible to humans, such as infrared light. The device 110 may include a camera 212 mounted to a fixed surface of the device 110; the device 110 may further include a camera 274 mounted on a display 214. The display 214, and thus the camera 274 mounted thereon, may be capable of horizontal rotation (e.g., camera "pan" motion) and/or vertical rotation (e.g., camera "tilt" motion). The device 110 may also feature a camera 276 mounted on a mast 272; this camera 276 may also be capable of pan and tilt and may further change its vertical position with respect to the device 110 upon extension/retraction of the mast 272 (e.g., camera "pedestal" motion).

One or more cameras 212 may be mounted to the front of the device 110; two cameras 212 may, for example, be used to provide for stereo vision. The distance between two cameras 212 may be, for example, 5-15 centimeters; in some embodiments, the distance between the cameras 212 is 10 centimeters. In some embodiments, the cameras 212 may exhibit a relatively wide horizontal field-of-view. For example, the horizontal field-of-view may be between 90° and 110°. A relatively wide field-of-view may provide for easier detection of moving objects, such as users or pets, which may be in the path of the device 110. Also, the relatively wide field-of-view may provide for the device 110 to more easily detect objects when rotating or turning.

Cameras 212 used for navigation may be of different resolution from, or sensitive to different wavelengths than, other cameras 274, 276 used for other purposes, such as video communication. For example, navigation cameras 212 may be capable of capturing infrared light, allowing the device 110 to operate in darkness or semi-darkness, while a camera 274 mounted on the display 214 and/or a camera 276 mounted on a mast 272 may be capable of capturing visible light and may be used to generate images suitable for viewing by a human. The navigation camera(s) 212 may have a resolution of approximately 300 kilopixels, while the other cameras 274, 276 may have a resolution of approximately 10 megapixels. In some implementations, navigation may use a single camera 212.

The cameras 212 may operate to provide stereo images of the environment, the user, or other objects as shown in, for example, FIG. 2E. For example, images from the cameras 212 may be accessed and used to generate stereo-image data corresponding to a face of a user. This stereo-image data may then be used for facial recognition, user identification, gesture recognition, gaze tracking, and/or other uses.

The display 214 may be mounted on a movable mount. The movable mount may allow the display to move along one or more degrees of freedom. For example, the display 214 may tilt, pan, change elevation, and/or rotate. In some embodiments, the size of the display 214 may be approximately 8 inches as measured diagonally from one corner of the display 214 to another.

An ultrasonic sensor 218 may be mounted on the front (and/or other surface) of the device 110 and may be used to provide sensor data that represents objects in front of the device 110. One or more loudspeakers 220 may be mounted on the device 110; the loudspeakers 220 may have different audio properties. For example, low-range, mid-range, and/or high-range loudspeakers 220 may be mounted on the front of the device 110. The loudspeakers 220 may be used to provide audible output such as alerts, music, and/or human speech (such as during a communication session with another user).

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors 224, 226 may be disposed on the front and/or underside of the device 110. The floor optical-motion sensors 224, 226 may provide indication indicative of motion of the device 110 relative to the floor or other surface underneath the device 110. In some embodiments, the floor optical-motion sensors 224, 226 comprise a light source, such as light-emitting diode (LED) and/or an array of photodiodes. In some implementations, the floor optical-motion sensors 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 224, 226 may provide other information, such as data indicative of a pattern present on the floor, composition of the floor, color of the floor, and so forth. For example, the floor optical-motion sensors 224, 226 may utilize an optoelectronic sensor that may detect different colors or shades of gray, and this data may be used to generate floor characterization data.

FIG. 2B illustrates a side view of the device 110 according to various embodiments of the present disclosure. In this side view, the left side of the device 110 is illustrated; the right side may include similar features. The mast 272 is extended to a first position; a camera 276 is disposed at an upper end of the mast 272. An ultrasonic sensor 228 and an optical sensor 230 may be disposed on either side of the device 110. The camera 276 may be capable of rotation, panning, and tilting, and may capture a panoramic image.

The disposition of components of the device 110 may be arranged such that a center of gravity 232 is located between a wheel axle 234 of the front wheels 202 and the caster 204. Such placement of the center of gravity 232 may result in improved stability of the device 110 and may also facilitate lifting by a carrying handle.

In this illustration, the caster is shown in a trailing configuration, in which the caster is located behind or aft of the wheel axle 234 and the center of gravity 232. In another implementation, the caster may be in front of the axle of the wheels 202. For example, the caster 204 may be a leading caster 204 positioned forward of the center of gravity 232.

The device 110 may encounter a variety of different floor surfaces of the environment 102 and may transition between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

FIG. 2C illustrates a rear view of the device 110 according to various embodiments of the present disclosure. In this view, as with the front view, a first pair of optical sensors 242 may be located along the lower edge of the rear of the device 110, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within a lower structure of the device 110. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 272, which may include a camera 276 and a light 258.

Figure 2D:
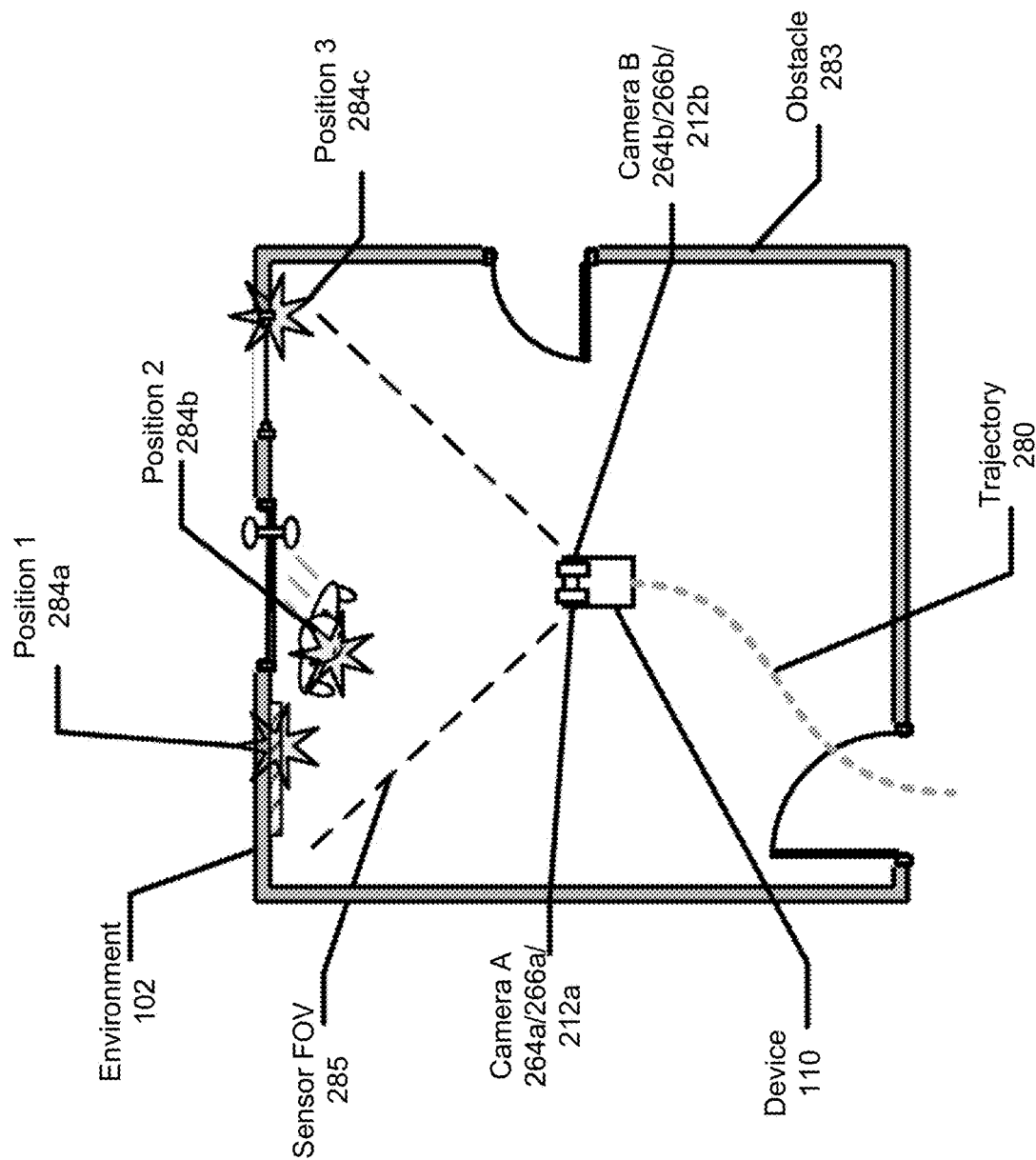
FIG. 2D illustrates a view of an autonomously motile device in an environment according to embodiments of the present disclosure.

As shown in FIG. 2D, the autonomously motile device 110 may move in the environment 102. The motion of the autonomously motile device 110 may be described as a trajectory 280, as shown in FIG. 2D. In some implementations, the trajectory 280 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

As described above, one or more motors or other actuators enable the autonomously motile device 110 to move from one location in the environment 102 to another. For example, a motor may be used to drive a wheel attached to a chassis of the autonomously motile device 110, which causes the autonomously motile device 110 to move. The autonomously motile device 110 may turn, move forward, move backward, and so forth. In another example, actuators may move legs allowing the autonomously motile device 110 to walk.

Figure 11A:
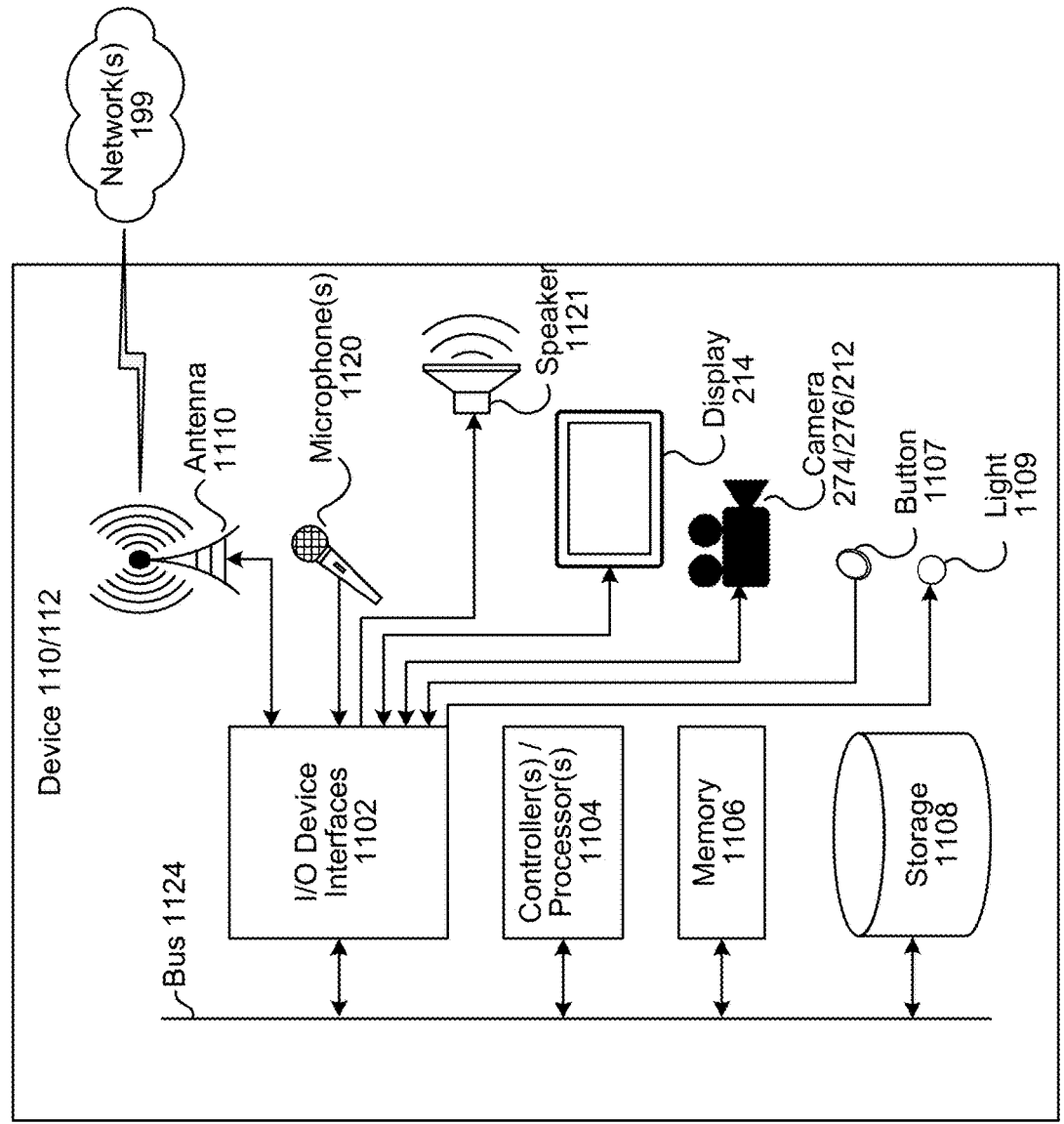
FIG. 11A illustrates a block diagram of an autonomously motile device according to embodiments of the present disclosure.

The autonomously motile device 110 may include one or more sensors 1154 (shown below in FIG. 11D). For example, the sensors 1154 may include a first camera 212*a*, a second camera 212*b*, an inertial measurement unit (IMU) 1180, microphones, time-of-flight (TOF) sensors, and so forth. The first camera 212*a* and the second camera 212*b* may be mounted to a common rigid structure that maintains a relative distance between the cameras 212*a*, 212*b*. An IMU 1180 may be attached to this common rigid structure, or one of the cameras affixed thereto. The first camera 212*a* and the second camera 212*b* may be arranged such that a sensor field-of-view 285 of the first camera 212*a* overlaps at least in part a sensor field-of-view of the second camera 212*b*. The sensors 1154 may generate sensor data 1147 (which may be stored in storage 1108 as illustrated in FIG. 11C discussed below). The sensor data 1147 may include image data 1142 acquired by the first camera 212*a* and the second camera 212*b*. For example, as shown in FIG. 2E, a pair of images 282 may comprise image data 1142 from the first camera 212*a* and the second camera 212*b* that are acquired at the same time. For example, a first pair of images 282*a* may be acquired at time $t_1$ and a second pair of images 282*b* may be acquired at time $t_2$. Some or all of the image data 1142 and/or audio data 1143 may be sent to the user device 112 for output thereon. The sensors 1154 are discussed in more detail with regard to FIG. 11D.

During operation the autonomously motile device 110 may determine input data. The input data may include or be based at least in part on sensor data 1147 from the sensors 1154 onboard the autonomously motile device 110. In one implementation, a speech processing component 1137 (which may be the speech-processing component illustrated in FIG. 3) may process raw audio data obtained by a microphone on the autonomously motile device 110 and produce input data. For example, the user may say "robot, come here" which may produce input data "come here". In another implementation, the input data may comprise information such as a command provided by another computing device, such as a smartphone or tablet computer.

Figure 11B:
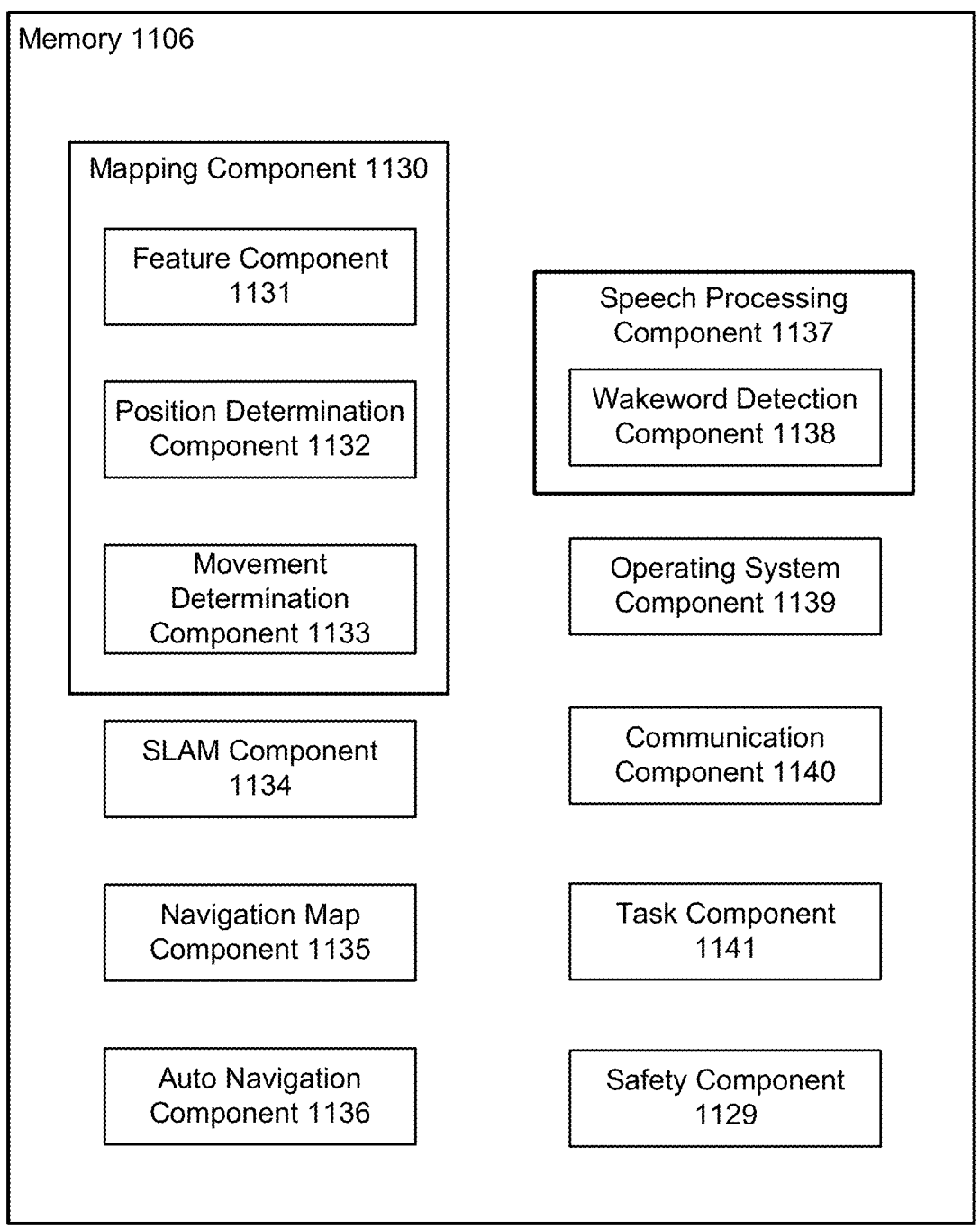
FIG. 11B illustrates components that may be stored in a memory of an autonomously motile device according to embodiments of the present disclosure.
Figure 11C:
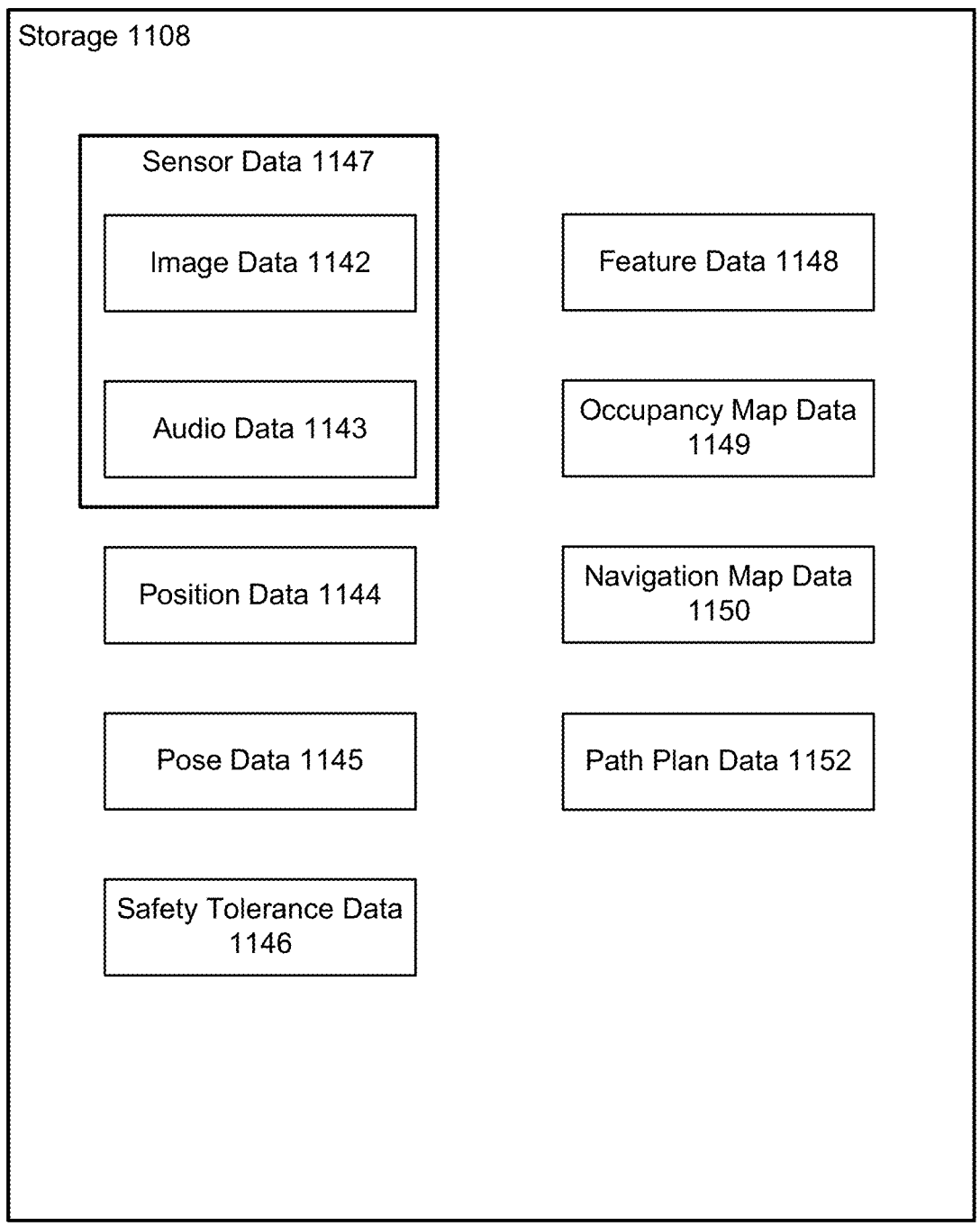
FIG. 11C illustrates data that may be stored in a storage of an autonomously motile device according to embodiments of the present disclosure.

A mapping component 1130 (which may be included in memory 1106 as illustrated in FIG. 11B) determines a representation of the environment 102 that includes the obstacles 283 and their location in the environment 102. During operation the mapping component 1130 uses the sensor data 1147 from various sensors 1154 to determine information such as where the autonomously motile device 110 is, how far the autonomously motile device 110 has moved, the presence of obstacles 283, where those obstacles 283 are, and so forth.

Figure 2F:
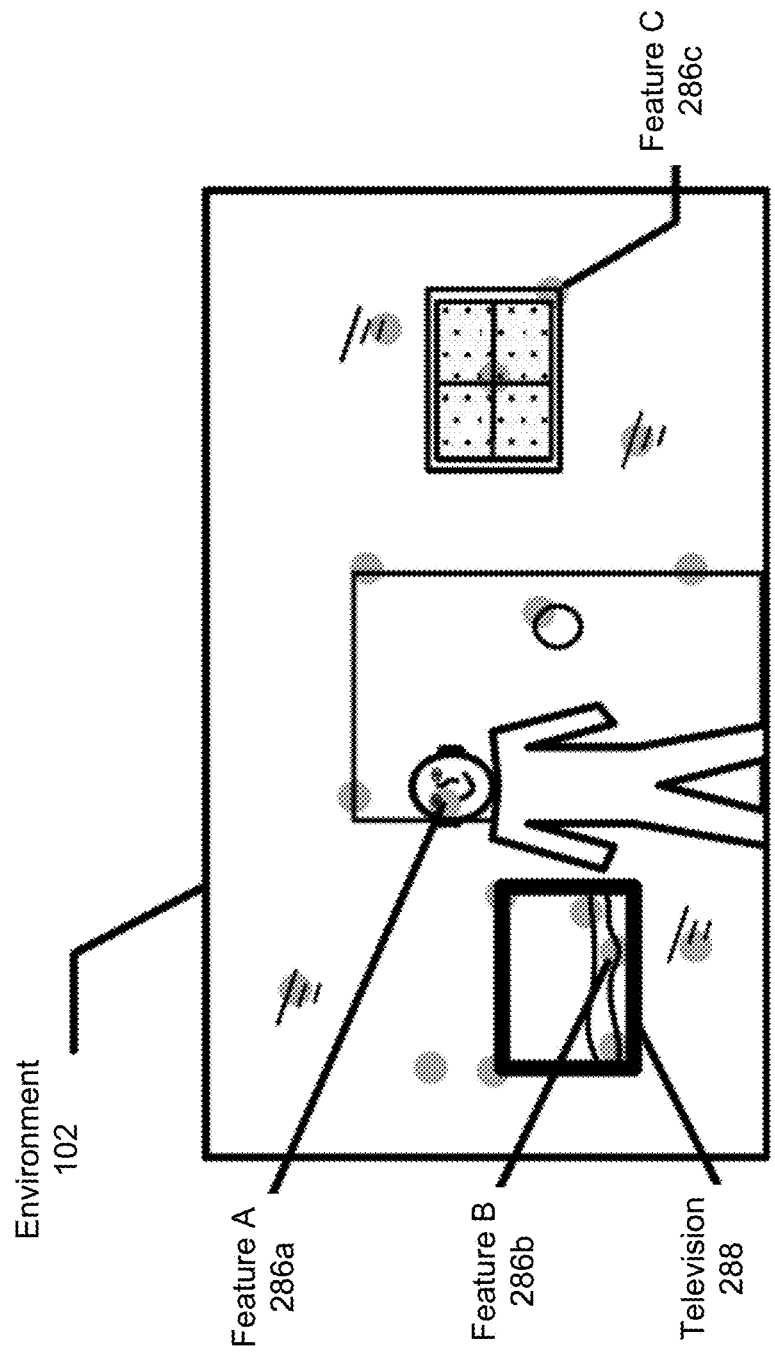

A feature module processes at least a portion of the image data 1142 to determine first feature data 1148. The first feature data 1148 is indicative of one or more features 286 that are depicted in the image data 1142. For example, as shown in FIG. 2F, the features 286 may be edges of doors, shadows on the wall, texture on the walls, portions of artwork in the environment 102, and so forth. The environment 102 may include display devices that are capable of changing the images they portray. For example, a television 288 may be presented in the environment 102. The picture presented by the television 288 may also have features 286.

Various techniques may be used to determine the presence of features 286 in image data 1142. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 286 in the image data 1142. A feature 286 that has been detected may have an associated descriptor that characterizes that feature 286. The descriptor may comprise a vector value in some implementations. For example, the descriptor may comprise data indicative of the feature with respect to 256 different dimensions.

The first feature data 1148 may comprise information such the descriptor for the feature 286, the images that the feature 286 was detected in, location in the image data 1142 of the feature 286, and so forth. For example, the first feature data 1148 may indicate that in a first image the feature 286 is centered at row 994, column 312 in the first image. These data and operations, along with those discussed below, may be used by the autonomously motile device 110, and/or other devices, to perform the operations described herein.

Regarding types of movement, the device 110 may move a component of the device 110 (such as a mast, display, arm, or other such component) as described herein, the device 110 may move in a single location in the environment 102 (e.g., rotate at a location), and/or move within the environment 102 (from, e.g., a first location to a second location). These movements may collectively be referred to as a change in pose of the device 110 from a first pose to a second pose. The first pose of the device 110 may be a first arrangement of components of the device 110, first orientation of the device at a position in the environment 102, and first position in the environment 102; the second pose of the device 110 may be a second arrangement of components of the device 110, second orientation of the device at a position in the environment 102, and second position in the environment 102. Only one of the first arrangement, first orientation, and/or first position may vary between the first pose and the second pose (e.g., the change in pose may include only one of a change in arrangement, orientation, and/or position). The change in pose may, however, include a change in more than one of the first arrangement, first orientation, and/or first position.

Figure 3:
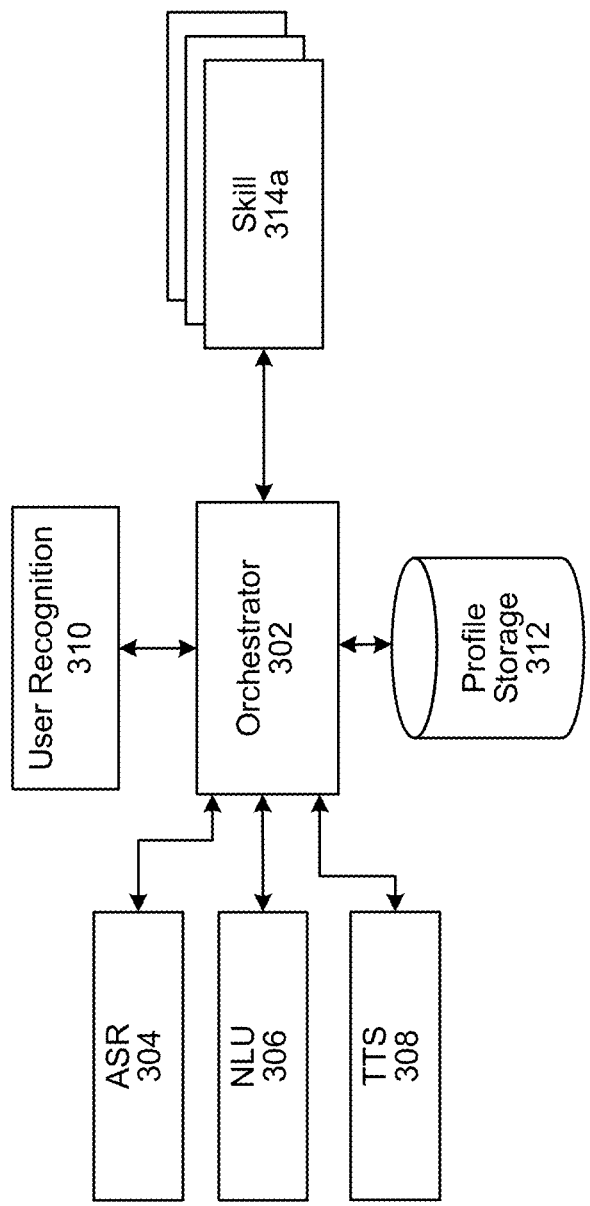
FIG. 3 illustrates a speech-processing system in accordance with embodiments of the present disclosure.

A speech-processing system is illustrated in FIG. 3. As explained in further detail below, one or more speech-processing systems may be disposed on the user device 112, on the autonomously motile device 110, on the remote system 120, or be distributed on some combination thereof. If some or all of the speech-processing system is disposed on the remote system 120, the user device 112 and/or autonomously motile device 110 may send audio data representing an utterance to the remote system 120 for processing. The user device 112 and/or autonomously motile device 110 may begin sending the audio data upon detection of a voice, upon detection of a wakeword, or upon detection of other user input, such as a touch gesture on a computer display. If the user device 112, autonomously motile device 110, and/or remote system 120 determines that an utterance corresponds to the autonomously motile device 110, the user device 112 and/or remote system 120 may send a command represented by the utterance to the autonomously motile device 110, as explained herein An audio capture component(s), such as a microphone or array of microphones of the user device 112 and/or autonomously motile device 110, captures audio. The user device 112, autonomously motile device 110, and/or remote system 120 may process audio data representing the audio to determine whether speech is detected. The user device 112, autonomously motile device 110, and/or remote system 120 may use various techniques to determine whether audio data includes speech. In some examples, the user device 112, autonomously motile device 110, and/or remote system 120 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 112, autonomously motile device 110, and/or remote system 120 may implement a limited classifier configured to distinguish speech from background noise. The classifier may be implemented by techniques such as linear classifiers, support vector machines, and decision trees. In still other examples, the user device 112, autonomously motile device 110, and/or remote system 120 may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio, the user device 112, autonomously motile device 110, and/or remote system 120 may use a wakeword-detection component to perform wakeword detection to determine when a user intends to speak an input to the speech-processing system. An example wakeword is "Alexa." As used herein, a "wakeword" may refer to a single word or more than one consecutive words in speech. Wakeword detection may be performed without performing linguistic analysis, textual analysis, or semantic analysis. Instead, the audio data, representing the audio, is analyzed to determine if specific characteristics of the audio data match preconfigured acoustic waveforms, audio signatures, or other data to determine if the audio data "matches" stored audio data corresponding to a wakeword.

Thus, the wakeword-detection component may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword-detection component may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected and/or other user input is received, user device 112 and/or autonomously motile device 110 may "wake" and begin transmitting audio data representing the audio to the speech-processing system (and/or begin processing the audio data itself). The audio data may include data corresponding to the wakeword, or the user device 112 and/or autonomously motile device 110 may remove the portion of the audio corresponding to the wakeword prior to sending the audio data to the remote system 120 (and/or begin processing the audio data itself).

An orchestrator component 302 may receive the audio data. The orchestrator component 302 may include memory and logic that enables the orchestrator component 302 to transmit various pieces and forms of data to various components of the speech-processing system, as well as perform other operations. The orchestrator component 302 may send the audio data to an ASR component 304. The ASR component 304 transcribes the audio data into text data. The text data output by the ASR component 304 may represent one or more than one (e.g., in the form of an n-best list) ASR hypotheses representing speech represented in the audio data. The ASR component 304 interprets the speech in the audio data based on a similarity between the audio data and pre-established language models. For example, the ASR component 304 may compare the audio data with models for sounds (e.g., subword units, such as phonemes, etc.) and sequences of sounds to identify words that match the sequence of sounds of the speech represented in the audio data. The ASR component 304 outputs text data representing one or more ASR hypotheses. The text data output by the ASR component 304 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The orchestrator component 302 may send text data (e.g., text data output by the ASR component 304 or the received text data) to an NLU component 306. The NLU component 306 attempts to make a semantic interpretation of the phrase(s) or statement(s) represented in the received text data. That is, the NLU component 306 determines one or more meanings associated with the phrase(s) or statement(s) represented in the text data based on words represented in the text data. The NLU component 306 determines an intent representing an action that a user desires be performed as well as pieces of the text data that allow a device (e.g., the user device 112 and/or the autonomously motile device 110) to execute the intent. For example, if the text data corresponds to "play Spinal Tap music," the NLU component 306 may determine an intent that the speech-processing system output music and may identify "Spinal Tap" as an artist. For further example, if the text data corresponds to "what is the weather," the NLU component 306 may determine an intent that the speech-processing system output weather information associated with a geographic location of the autonomously motile device 110 and/or user device 112. In another example, if the text data corresponds to "go to the kitchen," the NLU component 306 may determine an intent that the user wishes the autonomously motile device 120 to move within its environment 102 to a room designated as the kitchen. The NLU component 306 may output NLU results data (which may include tagged text data, indicators of intent, etc.). The NLU results data may include an indication of which device, such as the autonomously motile device 110 and/or user device 112, should execute the intent.

As described above, the speech-processing system may perform speech processing using two different components (e.g., the ASR component 304 and the NLU component 306). One skilled in the art will appreciate that the speech-processing system, in at least some examples, may further implement a spoken language understanding (SLU) component that is configured to process the audio data to generate NLU results data.

In some examples, the SLU component may be equivalent to the ASR component 304 and the NLU component 306. For example, the SLU component may process the audio data and generate NLU data. The NLU results data may include intent data and/or slot data. While the SLU component may be equivalent to a combination of the ASR component 304 and the NLU component 306, the SLU component may process audio data and directly generate the NLU results data, without an intermediate step of generating text data (as does the ASR component 304). As such, the SLU component may take the audio data representing natural language speech and attempt to make a semantic interpretation of the natural language speech. That is, the SLU component may determine a meaning associated with the natural language speech and then implement that meaning. For example, the SLU component may interpret the audio data representing natural language speech from the user in order to derive an intent or a desired action or operation from the user. In some examples, the SLU component outputs a most likely NLU hypothesis recognized in the audio data, or multiple NLU hypotheses in the form of a lattice or an N-best list with individual hypotheses corresponding to confidence scores or other scores (such as probability scores, etc.).

The speech-processing system may include one or more skills 314. A "skill" may be software running on the speech-processing system that is akin to a software application running on a traditional computing device. That is, a skill 314 may enable the speech-processing system to execute specific functionality in order to provide data or produce some other requested output. For example, one skill 314 may be used to control the autonomously motile device 110.

The speech-processing system may be configured with more than one skill 314. For example, a weather service skill may enable the speech-processing system to provide weather information, a car service skill may enable the speech-processing system to book a trip with respect to a taxi or ride sharing service, a restaurant skill may enable the speech-processing system to order a pizza with respect to the restaurant's online ordering system, etc. A skill 314 may operate in conjunction between the speech-processing system and other devices, such as the user device 112, in order to complete certain functions. Inputs to a skill 314 may come from speech processing interactions or through other interactions or input sources. A skill 314 may include hardware, software, firmware, or the like that may be dedicated to a particular skill 314 or shared among different skills 314.

Additionally or alternatively to being implemented by the speech-processing system, a skill 314 may be implemented by a skill system. Such may enable a skill system to execute specific functionality in order to provide data or perform some other action requested by a user. Skills may be associated with different domains, such as smart home, music, video, flash briefing, shopping, and custom (e.g., skills not associated with any pre-configured domain). The speech-processing system may be configured with a single skill 314 dedicated to interacting with more than one skill 314. The functionality described herein as a skill may be referred to using many different terms, such as an action, bot, app, or the like.

The speech-processing system may include a TTS component 308. The TTS component 308 may generate audio data (e.g., synthesized speech) from text data using one or more different methods. Text data input to the TTS component 308 may come from a skill 314, the orchestrator component 302, or another component of the speech-processing system.

In one method of synthesis called unit selection, the TTS component 308 matches text data against a database of recorded speech. The TTS component 308 selects matching units of recorded speech and concatenates the units together to form audio data. In another method of synthesis called parametric synthesis, the TTS component 308 varies parameters such as frequency, volume, and noise to create audio data including an artificial speech waveform. Parametric synthesis uses a computerized voice generator, sometimes called a vocoder.

The speech-processing system may include a user-recognition component 310 that recognizes one or more users associated with data input to the speech-processing system. The user-recognition component 310 may take as input the audio data and/or the text data. The user-recognition component 310 may perform user recognition by comparing speech characteristics in the audio data to stored speech characteristics of users. The user-recognition component 310 may additionally or alternatively perform user recognition by comparing biometric data (e.g., fingerprint data, iris data, etc.), received by the speech-processing system in correlation with a user input, to stored biometric data of users. The user-recognition component 310 may additionally or alternatively perform user recognition by comparing image data (e.g., including a representation of at least a feature of a user), received by the speech-processing system in correlation with a user input, with stored image data including representations of features of different users. The user-recognition component 310 may perform other or additional user recognition processes, including those known in the art. For a particular user input, the user-recognition component 310 may perform processing with respect to stored data of users associated with the user device 112 that captured the natural language user input.

The user-recognition component 310 determines whether a user input originated from a particular user. For example, the user-recognition component 310 may generate a first value representing a likelihood that a user input originated from a first user, a second value representing a likelihood that the user input originated from a second user, etc. The user-recognition component 310 may also determine an overall confidence regarding the accuracy of user recognition operations.

The user-recognition component 310 may output a single user identifier corresponding to the most likely user that originated the natural language user input. Alternatively, the user-recognition component 310 may output multiple user identifiers (e.g., in the form of an N-best list) with respective values representing likelihoods of respective users originating the natural language user input. The output of the user-recognition component 310 may be used to inform NLU processing, processing performed by a skill 314, as well as processing performed by other components of the speech-processing system and/or other systems.

The speech-processing system may include profile storage 312. The profile storage 312 may include a variety of information related to individual users, groups of users, devices, etc. that interact with the speech-processing system. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 312 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the speech-processing system with permission to allow the skill to execute with respect to the user's inputs. If a user does not enable a skill, the speech-processing system may not permit the skill to execute with respect to the user's inputs.

The profile storage 312 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 312 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The NLU component 306 may perform NLU processing on the text data to generate NLU results data. Part of this NLU processing may include entity resolution processing, whereby an entity, represented in the text data, is processed to corresponding to an entity known to the speech-processing system. In at least some examples, the speech-processing system may include one or more entity-resolution services, which may be implemented separately from the NLU component 306. In at least some examples, each entity-resolution service may correspond to a different domain. In such examples, the NLU component 306 may determine a domain to which the natural language user input most likely corresponds, and may send NLU results data (which may include a tagged and slotted representation of a user input) to an entity-resolution service corresponding to the domain. The entity-resolution service may resolve one or more tagged entities represented in the text data sent to the entity-resolution service. Thereafter, the entity-resolution service may send, to the NLU component 306, data representing the resolved entities. The NLU component 306 may incorporate the received text data into NLU results data representing the natural language user input. The NLU component 306 may send the NLU results data to the orchestrator component 302 for further processing, for example for sending to an appropriate skill 314.

The orchestrator component 302 may determine a profile identifier corresponding to the natural-language user input. In at least some examples, the orchestrator component 302 may receive a user identifier(s) from the user-recognition component 310, and may determine a profile identifier associated with the user identifier (or top scoring user identifier if more than one user identifier is received from the user-recognition component 310). The orchestrator component 302 may send, to the appropriate skill 314 or other downstream component, data representing the profile identifier, the NLU results data (or a portion thereof, such a portion representing an a domain to which the natural language user input corresponds), and an instruction to provide skill identifiers that are associated with the profile identifier and that correspond to the NLU results data (or portion thereof).

Using the NLU results data, the orchestrator component 302 may select a skill identifier corresponding to a skill 314 to be invoked with respect to the natural language user input. The orchestrator component 302 may send, to the skill 314 corresponding to the selected skill identifier, data representing at least a portion of the NLU results data as well as other data that may be used in performing the requested operation, for example data from vocal characteristic component. The skill 314 may then perform processing based on the received at least a portion of the NLU results data and/or other data.

The appropriate skill 314 may then perform operations in accordance with the NLU data and may return data to the orchestrator 302 for eventual output. The returned data may include text data that may be sent by the orchestrator 302 to the TTS component 308 for speech synthesis.

Figure 4A:
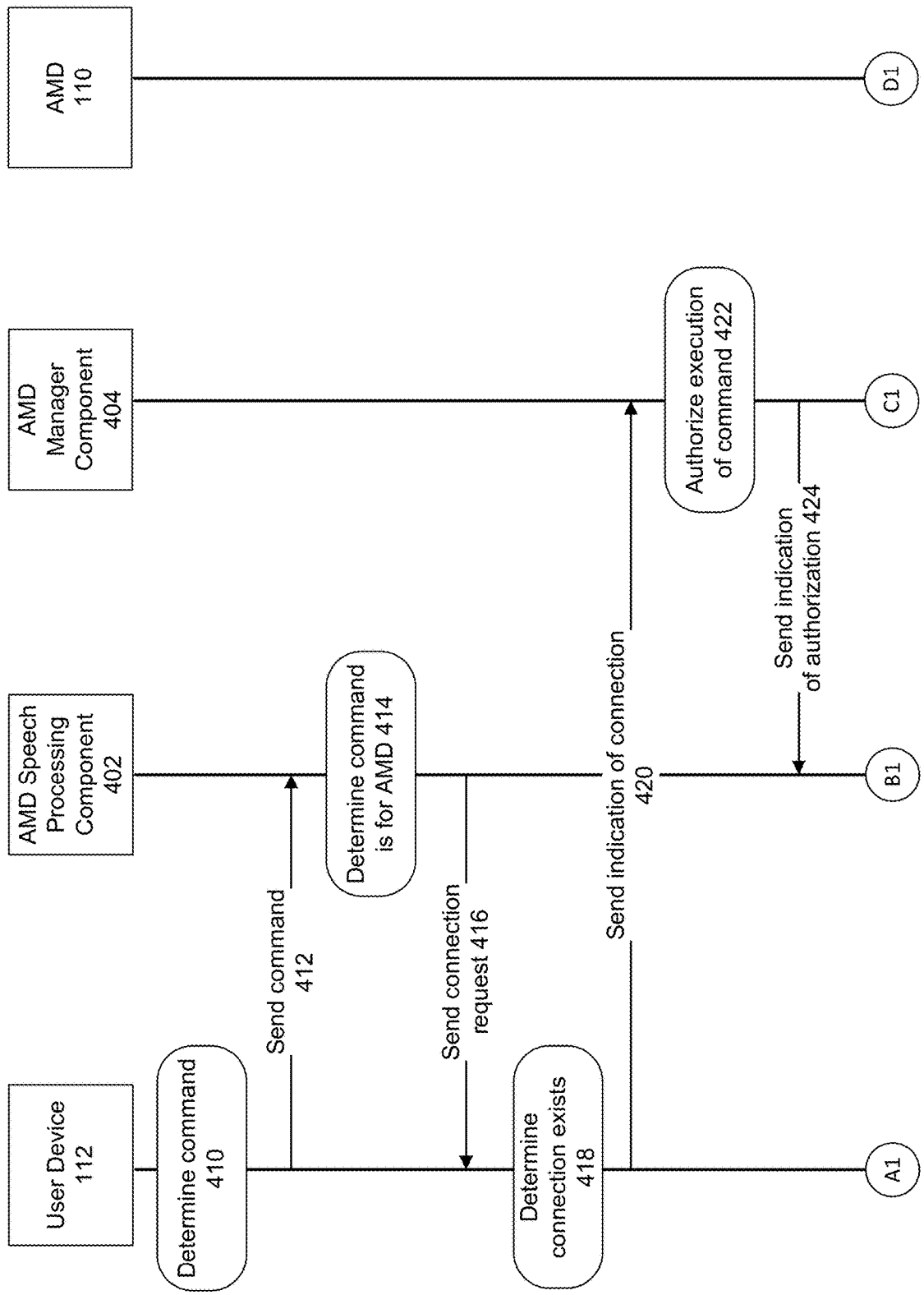

FIGS. 4A, 4B, 5, 6A, 6B, 7A, and 7B illustrate speech control of an autonomously motile device 110 using a user device 112 in accordance with embodiments of the present disclosure. Referring first to FIGS. 4A and 4B, the user device 112 determines (410) a command spoken by, for example, the user 104. As described herein, determination of the command may include processing, using a speech-processing component, audio data captured by a microphone of the user device 112 to determine an utterance that represents the command. As also described herein, determination of presence of a representation of a wakeword in the audio data (by, e.g., the user device 112) may precede determination of the command. The wakeword may be associated with the user device 112 and/or autonomously motile device 110. In some embodiments, the audio data includes the representation of the command but does not include the representation of the wakeword. In these embodiments, the user device 112, autonomously motile device 110, and/or remote system 120 may determine whether the command should be carried out by the user device 112 and/or autonomously motile device 110, as described herein. In some embodiments, determination of the command includes receiving a user input, such as a touch gesture, that corresponds to a speech command trigger element, such as an icon displayed on a display of the user device associated with speech input.

In some embodiments, the user device 112 includes the speech-processing component that determines the command. In other embodiments, as described herein, the remote system 120 includes the speech-processing component; the user device 112 may send, via the network 199, audio data to the remote system 120 upon detection of voice, the wakeword, and/or other user input. The remote system 120 may then send the command and/or data associated with the command to the user device 112.

In some embodiments, the user device 112 and/or remote system 120 determines that the command is associated with the user device 112, which may then perform an action responsive to the command, such as outputting audio. The user device 112 and/or remote system 120 may make this determination if, for example, the audio data includes a representation of a wakeword associated with the user device 112. In other embodiments, the user device 112 and/or remote system 120 may determine, using the NLU processing techniques described herein, that the command corresponds to an intent associated with the user device 112. For example, if the intent corresponds to "play music," the user device 112 and/or remote system 120 may determine that the user device 112 should output the corresponding music.

In other embodiments, however, neither the user device 112 and/or remote system 120 may determine that the command is associated with the user device 112 and, in particular, may determine that the command may be associated with the autonomously motile device 110. In these embodiments, the user device (and/or remote system 120) sends (412) data representing the command to an AMD speech-processing component 402. As described herein, the AMD speech-processing component 402 may send commands to the autonomously motile device 110 such as movement commands; the user device 112 (and/or a speech-processing component disposed thereon or on the remote system 120) may not be capable of sending these commands. The data representing the command may be audio data that includes a representation of an utterance and/or text data corresponding to the utterance (as generated by, for example, the ASR component 304).

The AMD speech-processing component 402 may determine (414) that the command corresponds to the autonomously motile device 110. The AMD speech-processing component 402 may determine, for example, that the audio data includes a representation of a wakeword corresponding to the autonomously motile device 110, such as "Robot." The AMD speech-processing component 402 may instead or in addition, using an NLU component 306, determine that an intent corresponding to the command, such as "movement," is associated with the autonomously motile device 110.

Before taking an action in response to the command, the AMD speech-processing component 402 may send (416), to the user device 112, a request to create or confirm a network connection (418) (using, e.g., the network 199) between the user device 112 and the autonomously motile device 110. Creation or confirmation of the network connection may include identifying the autonomously motile device 110, such as determining its address on the network 199 and/or determining a user profile (stored in, e.g., profile storage 312) associated with the user device 112 and/or autonomously motile device 110. The network connection may be a direct connection between the user device 112 and the autonomously motile device 110 or may be related through one or more other systems, such as the remote system 120.

Creation or confirmation of the network connection (418) may further include determining which of a plurality of autonomously motile devices 110 should take action corresponding to the command. The environment 102 may, for example, include two or more autonomously motile devices 110. In these embodiments, the AMD speech-processing component 402 may select one or more autonomously motile devices 110 based on one or more factors. These factors may include, for example, proximity of the autonomously motile devices 110 to humans in the environment, proximity of the autonomously motile devices 110 to one or more locations associated with the command, battery levels of the of the autonomously motile devices 110, capabilities of the of the autonomously motile devices 110 to act in accordance with the command and/or properties of a portion of the environment 102 proximate each autonomously motile device 110. In some embodiments, a device other than an autonomously motile devices 110 is selected to carry out the command. If, for example, the command corresponds to "call Mom," an autonomously motile device 110 closest to a person associated with the name "Mom" may be selected. If, on the other hand, another device is disposed closer to the person than is any autonomously motile device 110, that other device (e.g., a smart loudspeaker) may be selected in lieu of the autonomously motile device 110. If the command corresponds to "go to the kitchen," an autonomously motile device 110 having a most detailed map of a room in the environment 102 associated with "kitchen" may be selected.

Creation or confirmation of the network connection may include determining that image data captured by the autonomously motile device 110 is sent to, and is displayed by, the user device 112. The user device 112 (and associated user 104) may be disposed in a different environment than the environment 102 of the autonomously motile device 110; the user 104 may thus wish to view one or more images of the environment 102 before the autonomously motile device 110 acts in accordance with the command, particularly if the command corresponds to movement. The image data may be video data (e.g., a live video feed). The user 104 of the user device 112 may select which camera of the autonomously motile device 110 is used to capture the image data and/or cause a component of the autonomously motile device 110, such as the mast, to move to change how the camera captures the image data. The user device 112 may instead or in addition prompt the user 104 for confirmation of carrying out the command via an audio and/or video prompt.

The user device 112 (and/or remote system 120) may then send (420), to an autonomously motile device manager component 404, an indication that the network connection exists. The indication may further include information identifying the user device 112, the autonomously motile device 110, and/or the user 104 (such as an indication of a user account or user identification number of the user 104). The indication may further include authentication information, such as a security token, that indicates the identity of the user 104 and/or user device 112.

The autonomously motile device manager component 404 may be disposed on the remote system 120 and/or the autonomously motile device 110. The autonomously motile device manager component 404 may include one or more systems for managing the autonomously motile device 110; such management may include authorizing network communication to or from the autonomously motile device 110, associating the autonomously motile device 110 with a user account (during, for example, device registration), and/or permitting or denying commands to be sent to or from the autonomously motile device 110. In various embodiments, the autonomously motile device manager component 404 authorizes (422) execution of the command. Authorization may include determining that the user account of the user indicates allowance of execution; some users, such as children, may have user accounts that do not permit certain commands, such as capturing images. Authorization may further include determining that both the user device 112 and the autonomously motile device are associated with the same user account (e.g., a user, such as the owner of the devices 110, 112 is permitted to operate both devices 110, 112). The autonomously motile device manager component 404 may thereafter send (424), to the AMD speech-processing component 402, an indication of the authorization. This indication may be, for example, a security token associated with the command and/or autonomously motile device 110.

Referring to FIG. 4B, the AMD speech-processing component 402 may then send (426), to the autonomously motile device 110, data corresponding to the command. The data may be one or more computer instructions that represent the command. For example, if the command was "go to the kitchen," the data may include movement instructions such as "move forward 10 meters" or "turn left ninety degrees." The speech-processing component 402 may receive, in response, an indication that the data was received. The AMD speech-processing component 402 may send (428), to the user device 112, an indication of successfully sending the command. This indication may include audio data such as a tone and/or audio data representing speech. The user device 112 may thereafter output (430) the indication and the autonomously motile device 110 may execute (432) the command.

Referring to FIG. 5, as described above, the user device 112 may determine (510) a command and send (512) the command to the AMD speech-processing component 402, which may determine (514) that the command is for the autonomously motile device 110. As described above, the AMD speech-processing component 402 may send (516), to the user device 112, a connection request. Unlike the embodiments illustrated in FIGS. 4A and 4B, however, the user device 112 determines (518) that no connection exists and/or is capable of being made between the user device 112 and the autonomously motile device 110. The user device 112 may determine that no connection exists by sending a request for a response to the autonomously motile device 110 using the network 199 and not receiving said response. In other embodiments, the user device 112 may determine that no connection exists by sending a request to the remote system 120 for the status of the connection and receiving, from the remote system 120, a response indicating that no connection exists.

If no connection exists, the user device 112 may attempt to establish the connection by, for example, sending a corresponding request to the autonomously motile device 110 and/or autonomously motile device manager component 404. The user device 112 may determine, however, that it is not possible to establish the connection for one or more of a number of reasons. For example, the autonomously motile device 110 may be powered off, may have a low battery, or may not be connected to the network 199. Instead or in addition, the user 104 and/or user device 112 may not have permission to communicate with the autonomously motile device 110; the user device 112 may determine this lack of permission by, for example, sending a request to communicate to the remote system 120 and receiving a negative response. The user device 112 may thereafter send (518), to the autonomously motile device manager component 404, an indication of no connection. The autonomously motile device manager component 404 may, in response, send (520) an indication of the error to the AMD speech-processing component 402, which may output audio or video corresponding to the indication. The AMD speech-processing component 402 may instead or in addition send (522) the same or a corresponding indication to the user device 112, which may similarly output (524) corresponding audio and/or video.

Referring to FIGS. 6A and 6B, as described above, the user device 112 may determine (610) a command and send (612) the command to the AMD speech-processing component 402, which may determine (614) that the command is for the autonomously motile device 110. As described above, the AMD speech-processing component 402 may send (616), to the user device 112, a connection request. As in the embodiments illustrated in FIG. 5, the user device 112 determines (618) that the connection does not exist.

The user device 112 sends (620), to the autonomously motile device 110, a request to establish the connection. The autonomously motile device 110 and/or autonomously motile device manager component 404 may determine, as described herein, that the user 104 and/or user device 112 is authorized to establish the connection and send (662) connection data to the user device 112. The connection data may include data necessary to establish the connection, such as a network address of the autonomously motile device 110. The user device 112 and the autonomously motile device 110 may thereafter establish (624) the connection. As described above, the user device 112 may then send (626) an indication of the connection to the autonomously motile device manager component 404, which may authorize (628) execution of the command and send (630) corresponding authorization to the AMD speech-processing component 402. The AMD speech-processing component 402 may then send (632) the command and send (634) the indication of success. The user device 112 may output (636) corresponding audio and/or video, and the autonomously motile device 110 may execute (638) the command.

Figure 7A:
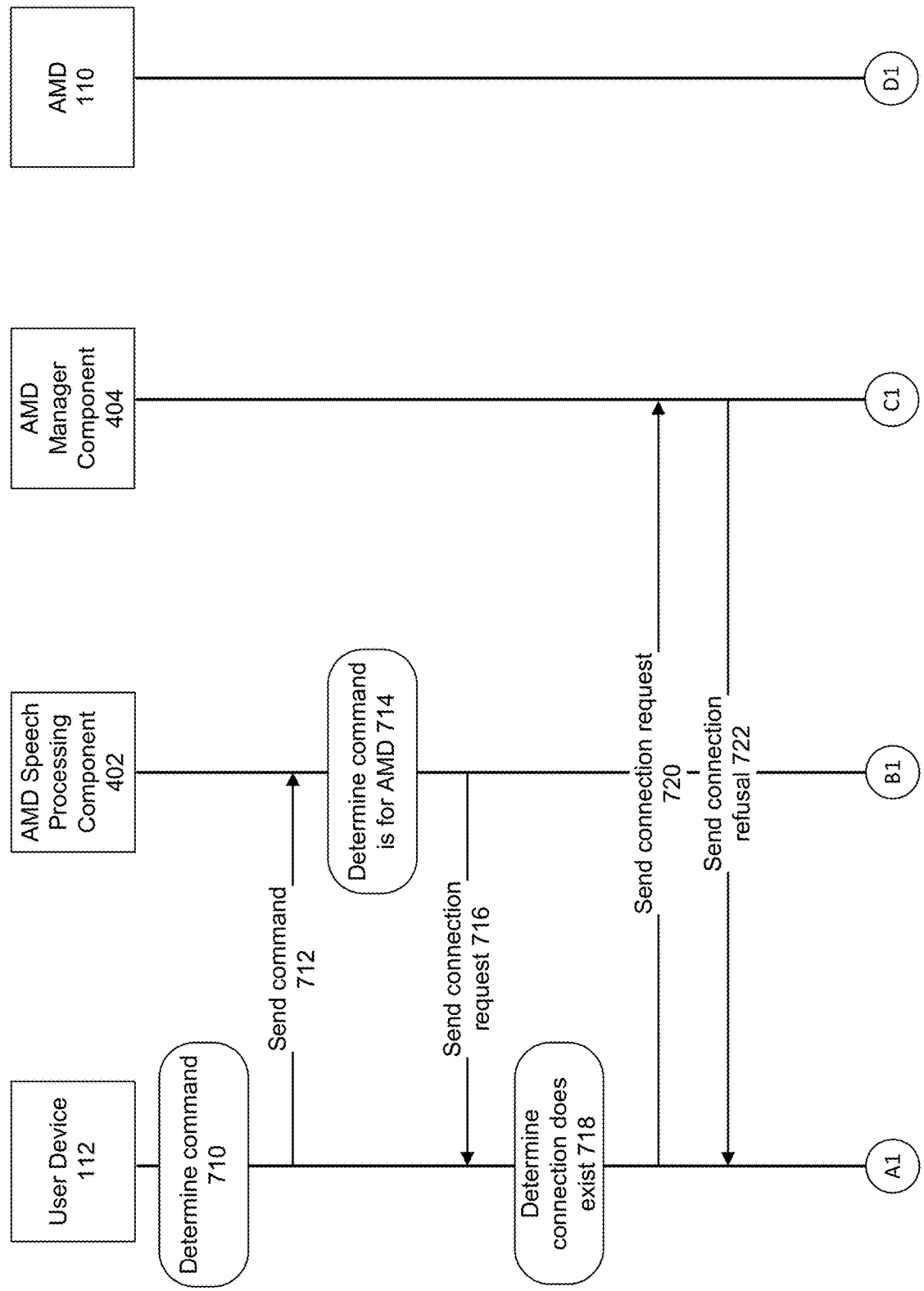

Referring to FIGS. 7A and 7B, as described above, the user device 112 may determine (710) a command and send (712) the command to the AMD speech-processing component 402, which may determine (714) that the command is for the autonomously motile device 110. As described above, the AMD speech-processing component 402 may send (716), to the user device 112, a connection request. As in the embodiments illustrated in FIG. 5, the user device 112 determines (618) that the connection does not exist.

The user device 112 sends (720), to the AMD manager component 404, a request to establish the connection. The autonomously motile device 110 and/or autonomously motile device manager component 404 may determine, as described herein, that the user 104 and/or user device 112 is not authorized to establish the connection and send (722) a refusal to establish the connection to the user device 112. The autonomously motile device 110 and/or autonomously motile device manager component 404 may instead or in addition send the refusal if the autonomously motile device 110 is not capable of executing the command, for example if the autonomously motile device 110 lacks sufficient battery power, is damaged or inoperative, is stuck, and/or is blocked by one or more obstacles. The user device 112 and the autonomously motile device 110 may thereafter send (724) an indication that the connection is not established. The autonomously motile device manager component 404 may thereafter send (726) an error indication to the AMD speech-processing component 402, which may send (728) it or a corresponding indication to the user device 112. The user device 112 may then output (730) corresponding audio and/or video.

Figure 8A:
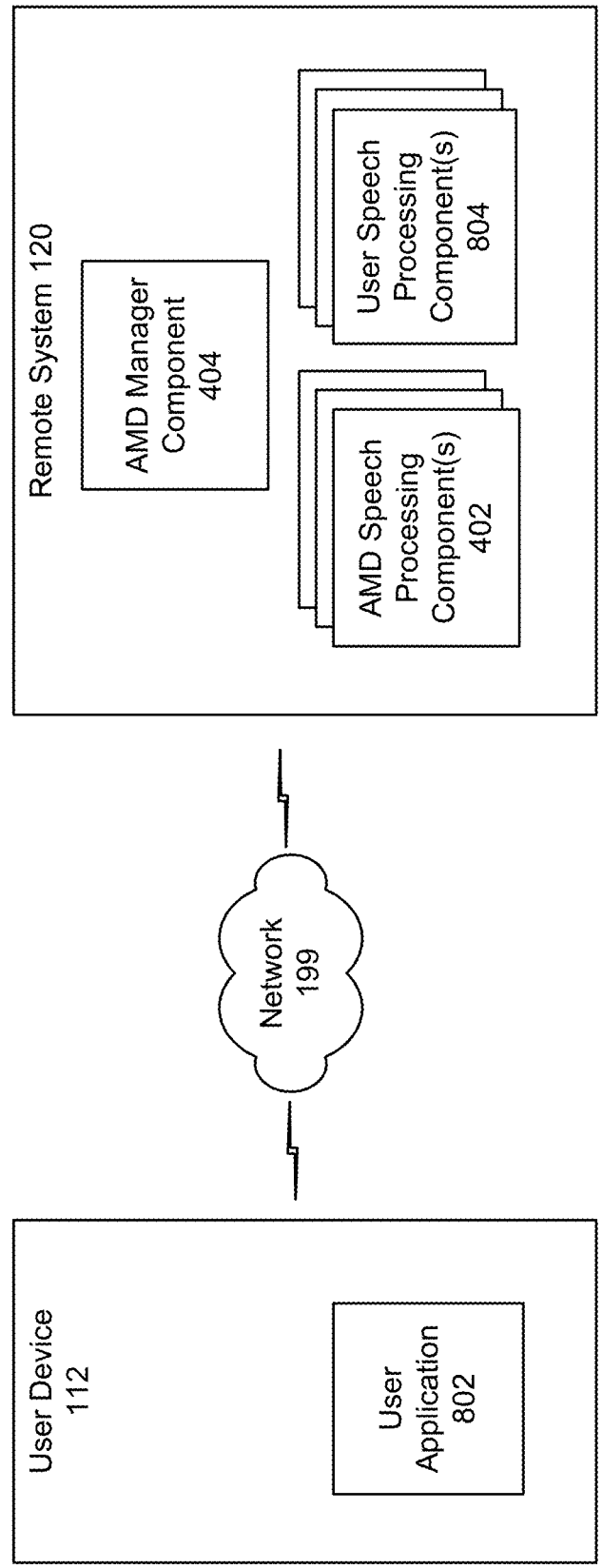

FIGS. 8A and 8B illustrate embodiments of the present disclosure. Referring first to FIG. 8A, the user device 112 may include one or more user application(s) 802 that perform some or all of the actions associated with the user device 112 as described herein. The user application(s) 802 may be one or more software program(s) installed in a memory of the user device 112; the user application(s) 802 may be installed via the network 199 by downloading it/them from a software repository such as an app store. The user 104 may associate the user application(s) 802 with a user account by providing account credentials such as a username and password. The user application(s) 802 may cause the user device 112 to capture audio and output audio and/or video as described herein.

The remote system 120 may include the autonomously motile device manager component 404, one or more AMD speech-processing component(s) 402, and one or more user speech-processing component(s) 804. The user speech-processing component(s) 804 may be used to process audio data to determine a command represented therein, as described herein. A first user speech-processing component 804 may be associated with a first set of commands and/or skills, while a second user speech-processing component 804 may be associated with a second, different set of commands and/or skills. For example, a first user speech-processing component 804 may be used to give speech commands to the autonomously motile device 110, while a second user speech-processing component 804 may be used to output content from a media streaming service. Similarly, a first AMD speech-processing component 402 may be associated with a first set of commands and/or skills, while a second AMD speech-processing component 402 may be associated with a second, different set of commands and/or skills. For example, a first AMD speech-processing component 402 may be used for navigation in an environment 102, while a second AMD speech-processing component 402 may be used for video communication. The AMD speech-processing component(s) 402 may be part of or otherwise associated with the AMD manager component. Referring to FIG. 8B, the user speech-processing component 812 may instead be disposed on the user device 112.

Figure 9:
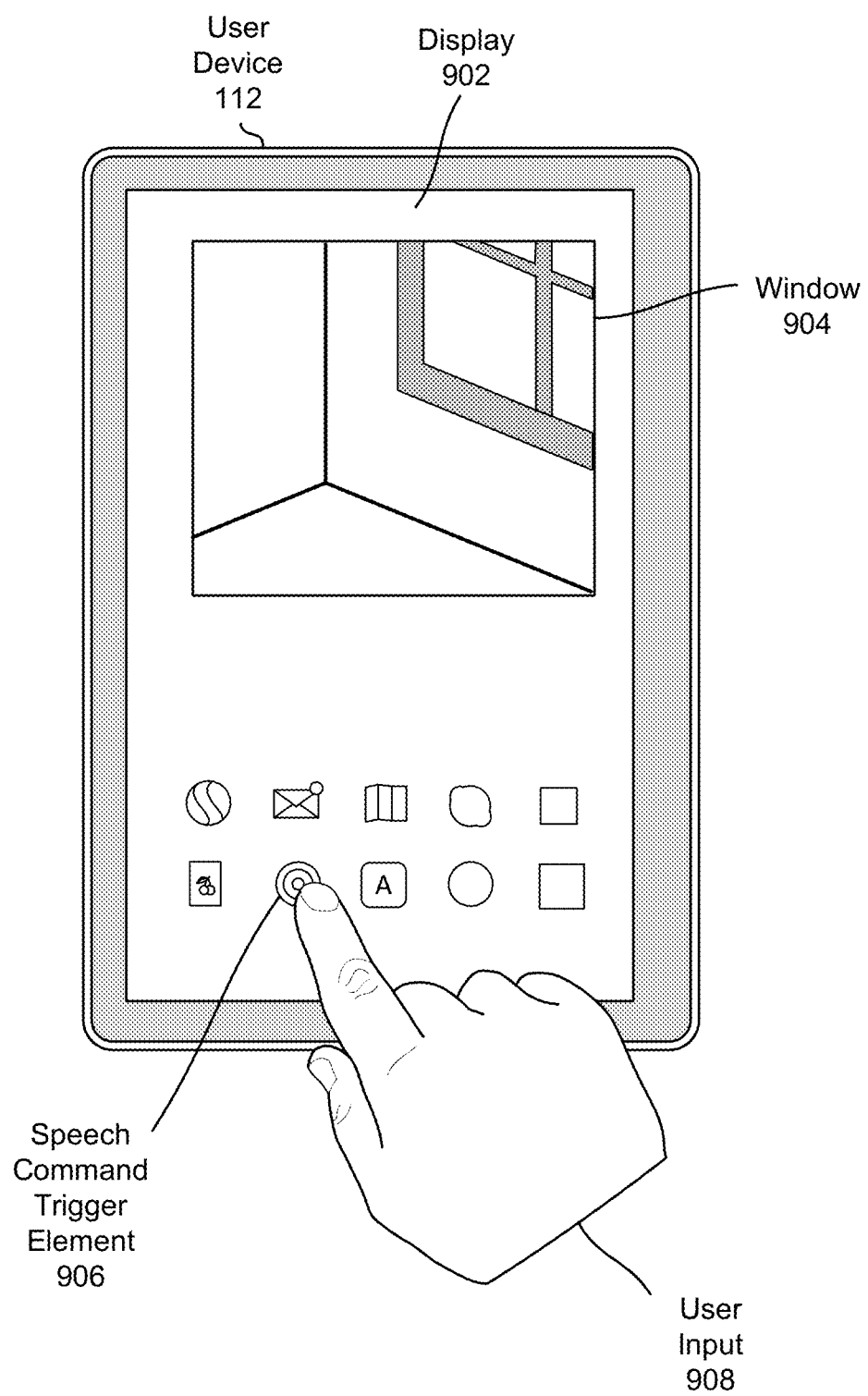
FIG. 9 illustrates a user device for speech control of an autonomously motile device in accordance with embodiments of the present disclosure.

FIG. 9 illustrates one embodiment of a user device 112. As illustrated, the user device 112 is a tablet computer, but the present disclosure is not limited to only this embodiment. The user device 112 may include a display 902 for displaying images; the display 902 may include a window 904 that displays image data from the autonomously motile device 110 (e.g., a live view). The display 902 may further include a number of user-interface elements; one such element may be a speech-command trigger element 906. When a user input 908 (e.g., a touch event) occurs on an area of the display 902 corresponding to the element 906, the user device 112 may begin processing audio data (as described herein) and/or begin transmitting audio data to the remote system 120 for processing.

Figure 10A:
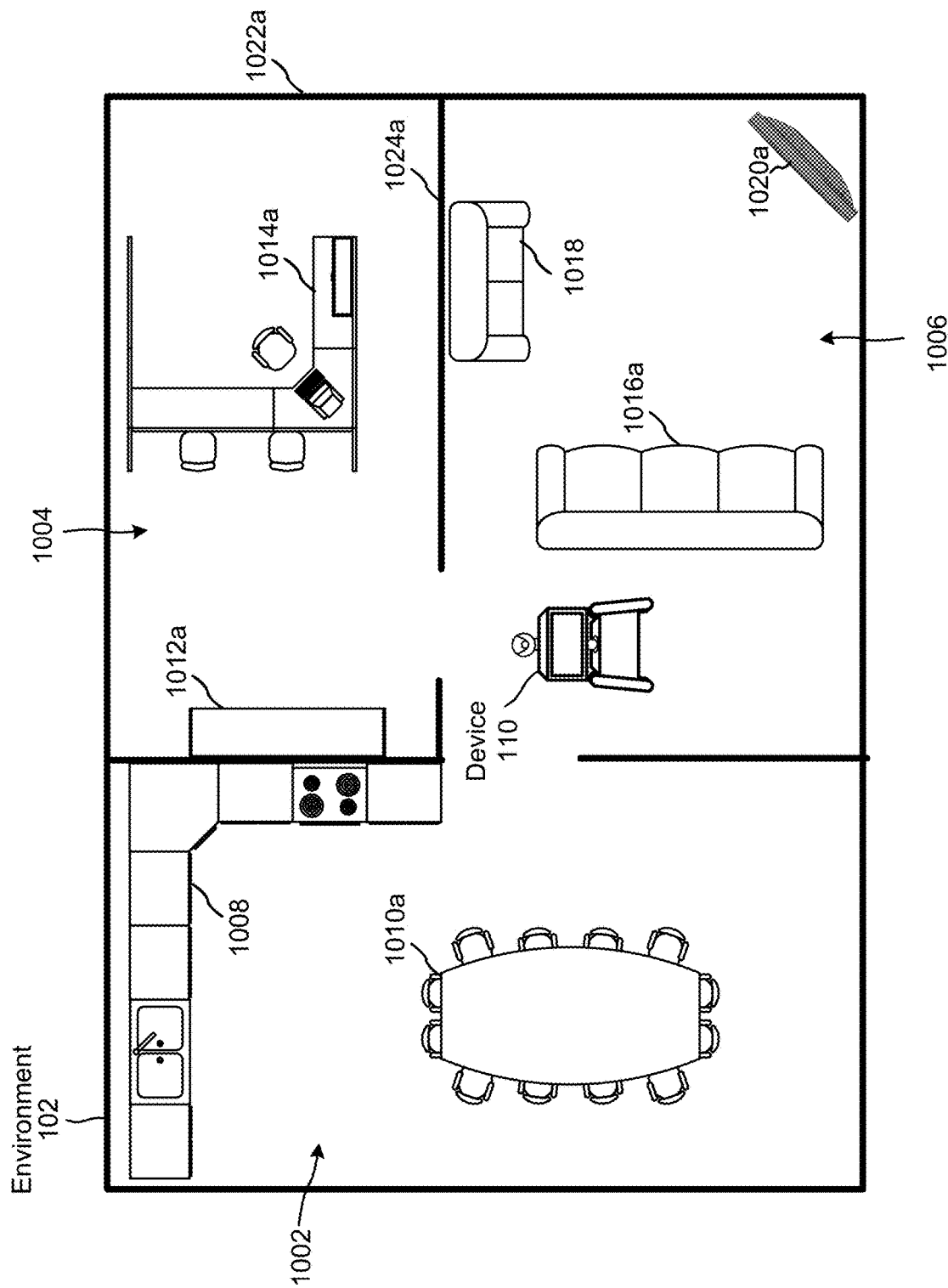
FIGS. 10A and 10B illustrate an environment of and a map for an autonomously motile device according to embodiments of the present disclosure.
Figure 10B:
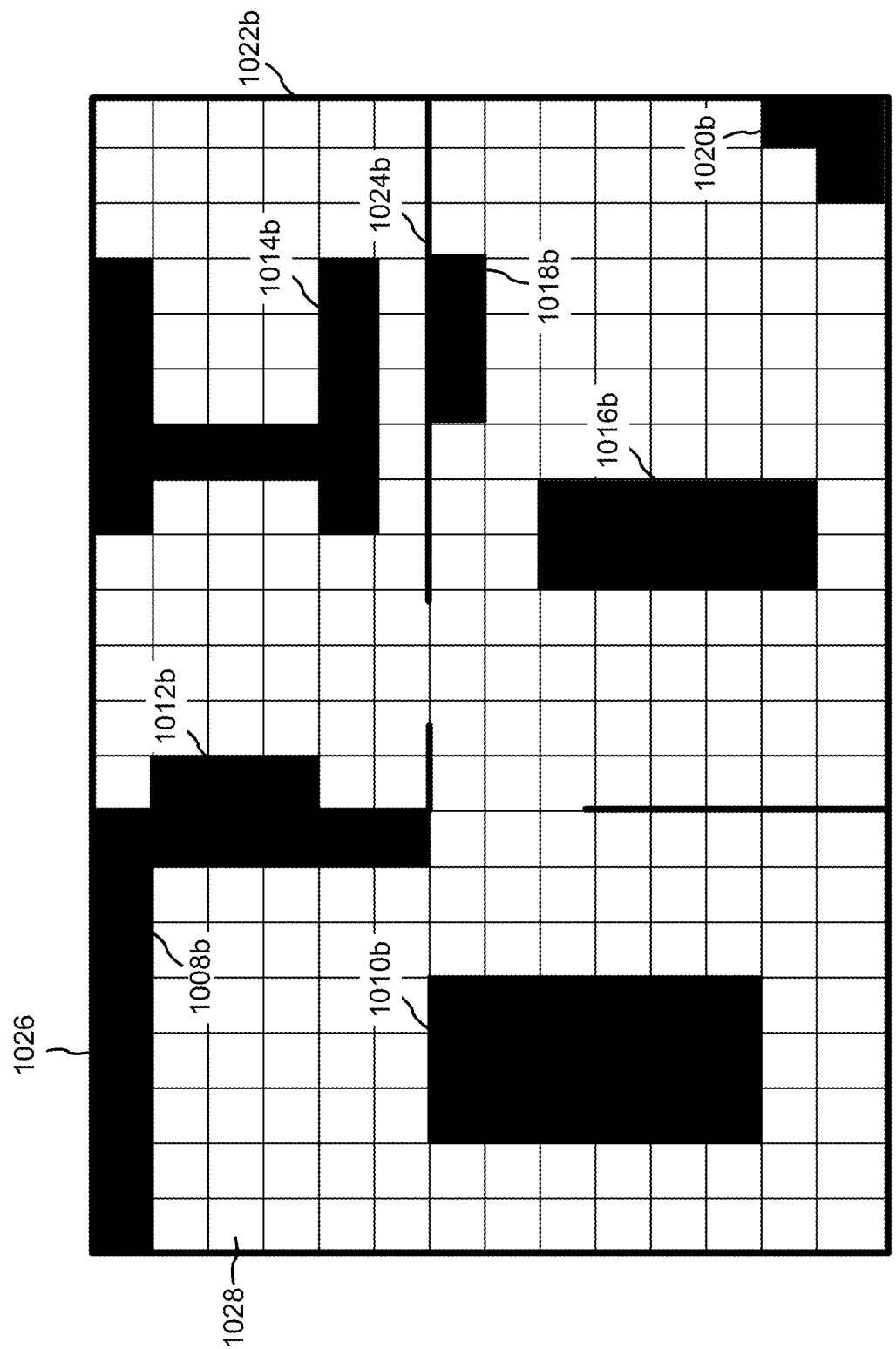

FIGS. 10A and 10B illustrate a representation of an environment 102 and a corresponding map of an autonomously motile device 110 according to embodiments of the present disclosure. Referring first to FIG. 10A, an example environment 102 includes three rooms 1002, 1004, 1006. A first room 1002 includes a kitchen countertop 1008a and a table and chairs 1010a. A second room 1004a includes bookshelves 1012a and a desk 1014a. A third room 1006a includes a sofa 1016a, a loveseat 1018a, and a wall-mounted television 1020a. In this example environment 102, some objects (such as sofa 1016a) extend from the floor of the environment 102 to a point between the ceiling and the floor; some objects (such as the television 1020a) do not touch the floor; and other objects (such as bookshelves 1012a) extend from floor to ceiling. The environment is bordered by exterior walls 1022a and may include one or more interior walls 1024a. The device 110 is capable of movement, as disclosed herein, within the environment 102. Environments 102, however, having any number of rooms and/or any types of objects are within the scope of the present disclosure.

FIG. 10B illustrates a map 1026 of the environment 102. The device 110 may generate the map 1026 or may receive the map 1026 from the system 120. The map 1026 includes data representing the position 1022b of exterior walls 1022a and data representing the position 1024b of interior walls 1024a. The map data may be a set of (x,y) coordinates that indicate the positions 1022b, 1024b of the walls 1022a, 1024a with respect to a (0,0) origin point, such as a bottom-left point of the map 1026. For example, if an exterior wall 1022a extends from the (0,0) origin point to a point 10 meters to the right, the map data may include the coordinates (0,0)-(10,0).

The map 1024 may further include data representing the positions 1008b, 1010b, 1012b, 1014b, 1016b, 1018b of the objects 1008a, 1010a, 1012a, 1014a, 1016a, 1018a, 1020a. The data representing the positions 1008b, 1010b, 1012b, 1014b, 1016b, 1018b, 1020b may similarly be a set of further (x,y) coordinates that represent the position and size of each object 1008a, 1010a, 1012a, 1014a, 1016a, 1018a, 1020a in the environment 102 with respect to the (0,0) origin point. For example, if the sofa 1016 has dimensions of 1 meter by 0.5 meters, and if it is positioned such that its lower-left corner is disposed at the grid point (10,1), the data representing its position may be (10,1)x(10.5, 2), denoting its lower-left corner and upper-right corner. Objects having more complicated shapes (with more than four sides) may be represented by additional sets of (x,y) coordinates, such that each pair of (x,y) coordinates defines a side of the object. Objects having curved or otherwise more complicated sides may be represented by data defining the curve, such as parameters defining an arc segment, or may be estimated as a set of straight lines.

The device 110 and/or system 120 may determine the map 1024 by processing input data, such as image data received from the camera 274 or infrared data received from one or more cameras 212. The device 110 may move within the environment 102 while it captures the image data. In some embodiments, device 110 and/or system 120 processes the image data using image-processing techniques to determine objects therein and then determines the position data based thereon. For example, if the device 110 captures image data that includes a representation of the sofa 1016a, the device 110 and/or system 120 may determine, based on a likely size of the sofa 1016a, how far the sofa 1016 is from the device 110 and base the (x,y) coordinates of the representation of the sofa 1016b thereon. In other embodiments, the device 110 and/or system 120 uses the multiple cameras to capture binocular images of the environment 102 and, based on a known distance between the multiple cameras, determines the distance between the device 110 and an object depicted in the binocular images. Any method of determining the coordinates of the positions 1022b, 1024b of the walls 1022a, 1024a and the positions 1008b, 1010b, 1012b, 1014b, 1016b, 1018b, 1020b of the objects 1008a, 1010a, 1012a, 1014a, 1016a, 1018a, 1020a is within the scope of the present disclosure.

The map data may further include a grid made up of grid units 828. If the map data does not include the grid, the device 110 may create the grid. Each grid unit may have dimensions of any size, such as 100 centimeters length and width. The grid units need not be square and need not be all the same size; they may be, for example hexagonal. The system 120 and/or device 110 may create the grid by beginning at the (0,0) origin point and placing grid tiles adjacent in the positive x- and y-dimensions. In other embodiments, the system 120 and/or device 110 may determine the length and width of each grid unit by determining the length and width of the map 1026 and/or rooms 1002, 1004, 1006 and dividing by an integer, such as ten, so that no fractionally-sized grid units 828 are needed to fully populate the map 1026 with the grid units 828.

When the device 110 determines a direction and distance of movement associated with a user input, as described herein, it may determine its position on the map 1026 and plot the distance in the direction. If an obstruction intersects with the plotted path, the device 110 may truncate its path to avoid hitting the obstruction, alter the path around the obstruction, or refuse to move altogether. The device 110 may send an indication of failure to the user device 112.

FIG. 11A is a block diagram conceptually illustrating an autonomously motile device 110 or user device 112 in accordance with the present disclosure. FIG. 12 is a block diagram conceptually illustrating example components of a system 120, such as remote server, which may assist with creating a map of an environment 102, ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing ASR processing, one or more servers for performing NLU processing, one or more skill system(s) for performing actions responsive to user inputs, etc. In operation, each of these devices (or groups of devices) may include computer-readable and computer-executable instructions that reside on the respective server.

FIG. 11A is a block diagram of some components of the autonomously motile device 110 such as network interfaces 1119, sensors 1154, and output devices, according to some implementations. The components illustrated here are provided by way of illustration and not necessarily as a limitation. For example, the autonomously motile device 110 may utilize a subset of the particular network interfaces 1119, output devices, or sensors 1154 depicted here, or may utilize components not pictured. One or more of the sensors 1154, output devices, or a combination thereof may be included on a moveable component that may be panned, tilted, rotated, or any combination thereof with respect to a chassis of the autonomously motile device 110.

The autonomously motile device 110 may include input/output device interfaces 1102 that connect to a variety of components such as an audio output component such as a speaker 1121, a wired headset or a wireless headset (not illustrated), or other component capable of outputting audio. The autonomously motile device 110 may also include an audio capture component. The audio capture component may be, for example, a microphone 1120 or array of microphones, a wired headset or a wireless headset, etc. If an array of microphones is included, approximate distance to a sound's point of origin may be determined by acoustic localization based on time and amplitude differences between sounds captured by different microphones of the array. The autonomously motile device 110 may additionally include a display 214 for displaying content. The autonomously motile device 110 may further include a camera 274/276/212, light 1109, button 1107, actuator, and/or sensor.

The network interfaces 1119 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the autonomously motile device 110 and other devices in the event that communication fails using one or more of the WLAN interface or the PAN interface. For example, in the event the autonomously motile device 110 travels to an area within the environment 102 that does not have Wi-Fi coverage, the autonomously motile device 110 may use the secondary RF link interface to communicate with another device such as a specialized access point, docking station, or other autonomously motile device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (1102/1202) may also include and/or communicate with communication components (such as network interface(s) 1119) that allow data to be exchanged between devices such as different physical servers in a collection of servers or other components.

The components of the device(s) 110 and/or the system(s) 120 may include their own dedicated processors, memory, and/or storage. Alternatively, one or more of the components of the device(s) 110 and/or the system(s) 120 may utilize the I/O interfaces (1102/1202), processor(s) (1104/1204), memory (1106/1206), bus (1124/1224), and/or storage (1108/1208) of the device(s) 110 and/or the system(s) 120, respectively.

FIG. 11B illustrates components that may be stored in a memory of an autonomously motile device according to embodiments of the present disclosure. Although illustrated as included in memory 1106, the components (or portions thereof) may also be included in hardware and/or firmware. FIG. 11C illustrates data that may be stored in a storage of an autonomously motile device according to embodiments of the present disclosure. Although illustrated as stored in storage 1108, the data may be stored in memory 1106 or in another component. FIG. 11D illustrates sensors that may be included as part of an autonomously motile device according to embodiments of the present disclosure.

A position determination component 1132 determines position data 1144 indicative of a position 284 of the feature 286 in the environment 102. In one implementation the position 284 may be expressed as a set of coordinates with respect to the first camera 212a. The position determination component 1132 may use a direct linear transformation triangulation process to determine the position 284 of a feature 286 in the environment 102 based on the difference in apparent location of that feature 286 in two images acquired by two cameras 274/276/212 separated by a known distance.

A movement determination module 1133 determines if the feature 286 is stationary or non-stationary. First position data 1144a indicative of a first position 284a of a feature 286 depicted in the first pair of images 282a acquired at time $t_1$ is determined by the position determination component 1132. Second position data 1144b of the same feature 286 indicative of a second position 284b of the same feature 286 as depicted in the second pair of images 282b acquired at time $t_2$ is determined as well. Similar determinations made for data relative to first position 284a and second position 284b may also be made for third position 284c, and so forth.

The movement determination module 1133 may use inertial data from the IMU 1180 or other sensors that provides information about how the autonomously motile device 110 moved between time $t_1$ and time $t_2$. The inertial data and the first position data 1144a is used to provide a predicted position of the feature 286 at the second time. The predicted position is compared to the second position data 1144b to determine if the feature is stationary or non-stationary. If the predicted position is less than a threshold value from the second position 284b in the second position data 1144b, then the feature 286 is deemed to be stationary.

Features 286 that have been deemed to be stationary may be included in the second feature data. The second feature data may thus exclude non-stationary features 286 and comprise a subset of the first feature data 1148 which comprises stationary features 286.

The second feature data may be used by a simultaneous localization and mapping (SLAM) component 1134. The SLAM component 1134 may use second feature data to determine pose data 1145 that is indicative of a location of the autonomously motile device 110 at a given time based on the appearance of features 286 in pairs of images 282. The SLAM component 1134 may also provide trajectory data indicative of the trajectory 280 that is based on a time series of pose data 1145 from the SLAM component 1134.

Other information, such as depth data from a depth sensor, the position data 1144 associated with the features 286 in the second feature data, and so forth, may be used to determine the presence of obstacles 283 in the environment 102 as represented by an occupancy map as represented by occupancy map data 1149.

The occupancy map data 1149 may comprise data that indicates the location of one or more obstacles 283, such as a table, wall, stairwell, and so forth. In some implementations, the occupancy map data 1149 may comprise a plurality of cells with each cell of the plurality of cells representing a particular area in the environment 102. Data, such as occupancy values, may be stored that indicates whether an area of the environment 102 associated with the cell is unobserved, occupied by an obstacle 283, or is unoccupied. An obstacle 283 may comprise an object or feature that prevents or impairs traversal by the autonomously motile device 110. For example, an obstacle 283 may comprise a wall, stairwell, and so forth.

The occupancy map data 1149 may be manually or automatically determined. For example, during a learning phase the user may take the autonomously motile device 110 on a tour of the environment 102, allowing the mapping component 1130 of the autonomously motile device 110 to determine the occupancy map data 1149. The user may provide input data such as tags designating a particular obstacle type, such as "furniture" or "fragile". In another example, during subsequent operation, the autonomously motile device 110 may generate the occupancy map data 1149 that is indicative of locations and types of obstacles such as chairs, doors, stairwells, and so forth as it moves unattended through the environment 102.

Modules described herein, such as the mapping component 1130, may provide various processing functions such as de-noising, filtering, and so forth. Processing of sensor data 1147, such as image data from a camera 274/276/212, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1147. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 1147 or other data. For example, the ANN may be trained using a supervised learning algorithm such that object identifiers are associated with images of particular objects within training images provided to the ANN. Once trained, the ANN may be provided with the sensor data 1147 and produce output indicative of the object identifier.

A navigation map component 1135 uses the occupancy map data 1149 as input to generate a navigation map as represented by navigation map data 1150. For example, the navigation map component 1135 may produce the navigation map data 1150 by inflating or enlarging the apparent size of obstacles 283 as indicated by the occupancy map data 1149.

An autonomous navigation component 1136 provides the autonomously motile device 110 with the ability to navigate within the environment 102 without real-time human interaction. The autonomous navigation component 1136 may implement, or operate in conjunction with, the mapping component 1130 to determine one or more of the occupancy map data 1149, the navigation map data 1150, or other representations of the environment 102.

The autonomously motile device 110 autonomous navigation component 1136 may generate path plan data 1152 that is indicative of a path through the environment 102 from the current location to a destination location. The autonomously motile device 110 may then begin moving along the path.

While moving along the path, the autonomously motile device 110 may assess the environment 102 and update or change the path as appropriate. For example, if an obstacle 283 appears in the path, the mapping component 1130 may determine the presence of the obstacle 283 as represented in the occupancy map data 1149 and navigation map data 1150. The now updated navigation map data 1150 may then be used to plan an alternative path to the destination location.

The autonomously motile device 110 may utilize one or more task components 1141. The task component 1141 comprises instructions that, when executed, provide one or more functions. The task components 1141 may perform functions such as finding a user, following a user, present output on output devices of the autonomously motile device 110, perform sentry tasks by moving the autonomously motile device 110 through the environment 102 to determine the presence of unauthorized people, and so forth.

The autonomously motile device 110 includes one or more output devices, such as one or more of a motor, light, speaker, display, projector, printer, and so forth. One or more output devices may be used to provide output during operation of the autonomously motile device 110.

The autonomously motile device 110 may use the network interfaces 1119 to connect to a network 199. For example, the network 199 may comprise a wireless local area network that in turn is connected to a wide area network such as the Internet.

The autonomously motile device 110 may be configured to dock or connect to a docking station. The docking station may also be connected to the network 199. For example, the docking station may be configured to connect to the wireless local area network 199 such that the docking station and the autonomously motile device 110 may communicate. The docking station may provide external power which the autonomously motile device 110 may use to charge a battery of the autonomously motile device 110.

The autonomously motile device 110 may access one or more servers 120 via the network 199. For example, the autonomously motile device 110 may utilize a wakeword detection component to determine if the user is addressing a request to the autonomously motile device 110. The wakeword detection component may hear a specified word or phrase and transition the autonomously motile device 110 or portion thereof to the wake operating mode. Once in the wake operating mode, the autonomously motile device 110 may then transfer at least a portion of the audio spoken by the user to one or more servers 120 for further processing. The servers 120 may process the spoken audio and return to the autonomously motile device 110 data that may be subsequently used to operate the autonomously motile device 110.

The autonomously motile device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth. In some implementations the other devices may include other AMDs 110, vehicles, and so forth.

In other implementations, other types of autonomous motile devices (AMD) may use the systems and techniques described herein. For example, the autonomously motile device 110 may comprise an autonomous ground vehicle that is moving on a street, an autonomous aerial vehicle in the air, autonomous marine vehicle, and so forth.

The autonomously motile device 110 may include one or more batteries (not shown) to provide electrical power suitable for operating the components in the autonomously motile device 110. In some implementations other devices may be used to provide electrical power to the autonomously motile device 110. For example, power may be provided by wireless power transfer, capacitors, fuel cells, storage flywheels, and so forth.

One or more clocks may provide information indicative of date, time, ticks, and so forth. For example, the processor 1104 may use data from the clock to associate a particular time with an action, sensor data 1147, and so forth.

The autonomously motile device 110 may include one or more hardware processors 1104 (processors) configured to execute one or more stored instructions. The processors 1104 may comprise one or more cores. The processors 1104 may include microcontrollers, systems on a chip, field programmable gate arrays, digital signal processors, graphic processing units, general processing units, and so forth.

The autonomously motile device 110 may include one or more communication component 1140 such as input/output (I/O) interfaces 1102, network interfaces 1119, and so forth. The communication component 1140 enable the autonomously motile device 110, or components thereof, to communicate with other devices or components. The communication component 1140 may include one or more I/O interfaces 1102. The I/O interfaces 1102 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1102 may couple to one or more I/O devices. The I/O devices may include input devices such as one or more of a sensor 1154, keyboard, mouse, scanner, and so forth. The I/O devices may also include output devices such as one or more of a motor, light, speaker 1121, display 214, projector, printer, and so forth. In some embodiments, the I/O devices may be physically incorporated with the autonomously motile device 110 or may be externally placed.

The I/O interface(s) 1102 may be configured to provide communications between the autonomously motile device 110 and other devices such as other AMDs 110, docking stations, routers, access points, and so forth, for example through antenna 1110 and/or other component. The I/O interface(s) 1102 may include devices configured to couple to personal area networks (PANs), local area networks (LANs), wireless local area networks (WLANS), wide area networks (WANs), and so forth. For example, the network interfaces 1119 may include devices compatible with Ethernet, Wi-Fi, Bluetooth, Bluetooth Low Energy, ZigBee, and so forth. The autonomously motile device 110 may also include one or more busses 1124 or other internal communications hardware or software that allow for the transfer of data between the various modules and components of the autonomously motile device 110.

As shown in FIG. 11A, the autonomously motile device 110 includes one or more memories 1106. The memory 1106 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1106 provides storage of computer-readable instructions, data structures, program modules, and other data for the operation of the autonomously motile device 110. A few example functional modules are shown stored in the memory 1106, although the same functionality may alternatively be implemented in hardware, firmware, or as a system on a chip (SoC).

The memory 1106 may include at least one operating system (OS) component 1139. The OS component 1139 is configured to manage hardware resource devices such as the I/O interfaces 1102, the I/O devices, the communication component 1140, and provide various services to applications or modules executing on the processors 1104. The OS component 1139 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 1106, or elsewhere may be a data store 1108 and one or more of the following modules. These modules may be executed as foreground applications, background tasks, daemons, and so forth. The data store 1108 may use a flat file, database, linked list, tree, executable code, script, or other data structure to store information. In some implementations, the data store 1108 or a portion of the data store 1108 may be distributed across one or more other devices including other AMDs 110, servers 120, network attached storage devices, and so forth.

A communication component 1140 may be configured to establish communication with other devices, such as other AMDs 110, an external server 120, a docking station, and so forth. The communications may be authenticated, encrypted, and so forth.

Other modules within the memory 1106 may include a safety component 1129, the mapping component 1130, the navigation map component 1135, the autonomous navigation component 1136, the one or more components 1141, a speech processing component 1137, or other components. The components may access data stored within the data store 1108, including safety tolerance data 1146, sensor data 1147, inflation parameters, other data, and so forth.

The safety component 1129 may access the safety tolerance data 1146 to determine within what tolerances the autonomously motile device 110 may operate safely within the environment 102. For example, the safety component 1129 may be configured to stop the autonomously motile device 110 from moving when an extensible mast of the autonomously motile device 110 is extended. In another example, the safety tolerance data 1146 may specify a minimum sound threshold which, when exceeded, stops all movement of the autonomously motile device 110. Continuing this example, detection of sound such as a human yell would stop the autonomously motile device 110. In another example, the safety component 1129 may access safety tolerance data 1146 that specifies a minimum distance from an object that the autonomously motile device 110 is to maintain. Continuing this example, when a sensor 1154 detects an object has approached to less than the minimum distance, all movement of the autonomously motile device 110 may be stopped. Movement of the autonomously motile device 110 may be stopped by one or more of inhibiting operations of one or more of the motors, issuing a command to stop motor operation, disconnecting power from one or more the motors, and so forth. The safety component 1129 may be implemented as hardware, software, or a combination thereof.

The safety component 1129 may control other factors, such as a maximum speed of the autonomously motile device 110 based on information obtained by the sensors 1154, precision and accuracy of the sensor data 1147, and so forth. For example, detection of an object by an optical sensor may include some error, such as when the distance to an object comprises a weighted average between an object and a background. As a result, the maximum speed permitted by the safety component 1129 may be based on one or more factors such as the weight of the autonomously motile device 110, nature of the floor, distance to the object, and so forth. In the event that the maximum permissible speed differs from the maximum speed permitted by the safety component 1129, the lesser speed may be utilized.

The navigation map component 1135 uses the occupancy map data 1149 as input to generate the navigation map data 1150. The navigation map component 1135 may produce the navigation map data 1150 to inflate or enlarge the obstacles 283 indicated by the occupancy map data 1149. One or more inflation parameters may be used during operation. The inflation parameters provide information such as inflation distance, inflation adjustment values, and so forth. In some implementations the inflation parameters may be based at least in part on the sensor FOV, sensor blind spot, physical dimensions of the autonomously motile device 110, and so forth.

The speech processing component 1137 may be used to process utterances of the user. Microphones may acquire audio in the presence of the autonomously motile device 110 and may send raw audio data 1143 to an acoustic front end (AFE). The AFE may transform the raw audio data 1143 (for example, a single-channel, 16-bit audio stream sampled at 16 kHz), captured by the microphone, into audio feature vectors that may ultimately be used for processing by various components, such as a wakeword detection module 1138, speech recognition engine, or other components. The AFE may reduce noise in the raw audio data 1143. The AFE may also perform acoustic echo cancellation (AEC) or other operations to account for output audio data that may be sent to a speaker of the autonomously motile device 110 for output. For example, the autonomously motile device 110 may be playing music or other audio that is being received from a network 199 in the form of output audio data. To prevent the output audio interfering with the device's ability to detect and process input audio, the AFE or other component may perform echo cancellation to remove the output audio data from the input raw audio data 1143, or other operations.

The AFE may divide the raw audio data 1143 into frames representing time intervals for which the AFE determines a number of values (i.e., features) representing qualities of the raw audio data 1143, along with a set of those values (i.e., a feature vector or audio feature vector) representing features/qualities of the raw audio data 1143 within each frame. A frame may be a certain period of time, for example a sliding window of 25 milliseconds of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 1143, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 1143) may be input into a wakeword detection module 1138 that is configured to detect keywords spoken in the audio. The wakeword detection module 1138 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the autonomously motile device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the autonomously motile device 110 (or separately from speech detection), the autonomously motile device 110 may use the wakeword detection module 1138 to perform wakeword detection to determine when a user intends to speak a command to the autonomously motile device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 1138 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local autonomously motile device 110 may "wake" and begin transmitting audio data (which may include one or more of the raw audio data 1143 or the audio feature vectors) to one or more server(s) 120 for speech processing. The audio data corresponding to audio obtained by the microphone may be processed locally on one or more of the processors 1104, sent to a server 120 for routing to a recipient device or may be sent to the server 120 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the autonomously motile device 110 before processing by the navigation map component 1135, prior to sending to the server 120, and so forth.

The speech processing component 1137 may include or access an automated speech recognition (ASR) module. The ASR module may accept as input raw audio data 1143, audio feature vectors, or other sensor data 1147 and so forth and may produce as output the input data comprising a text string or other data representation. The input data comprising the text string or other data representation may be processed by the navigation map component 1135 to determine the command to be executed. For example, the utterance of the command "robot, come here" may result in input data comprising the text string "come here". The wakeword "robot" may be omitted from the input data.

The autonomous navigation component 1136 provides the autonomously motile device 110 with the ability to navigate within the environment 102 without real-time human interaction. The autonomous navigation component 1136 may implement, or operate in conjunction with, the mapping component 1130 to determine the occupancy map data 1149, the navigation map data 1150, or other representation of the environment 102. In one implementation, the mapping component 1130 may use one or more simultaneous localization and mapping ("SLAM") techniques. The SLAM algorithms may utilize one or more of maps, algorithms, beacons, or other techniques to navigate. The autonomous navigation component 1136 may use the navigation map data 1150 to determine a set of possible paths along which the autonomously motile device 110 may move. One of these may be selected and used to determine path plan data 1152 indicative of a path. For example, a possible path that is the shortest or has the fewest turns may be selected and used to determine the path. The path is then subsequently used to determine a set of commands that drive the motors connected to the wheels. For example, the autonomous navigation component 1136 may determine the current location within the environment 102 and determine path plan data 1152 that describes the path to a destination location such as the docking station.

The autonomous navigation component 1136 may utilize various techniques during processing of sensor data 1147. For example, image data 1142 obtained from cameras 274/276/212 on the autonomously motile device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The autonomously motile device 110 may move responsive to a determination made by an onboard processor 1104, in response to a command received from one or more communication interfaces, as determined from the sensor data 1147, and so forth. For example, an external server 120 may send a command that is received using the network interface 1119. This command may direct the autonomously motile device 110 to proceed to find a particular user, follow a particular user, and so forth. The autonomously motile device 110 may then process this command and use the autonomous navigation component 1136 to determine the directions and distances associated with carrying out the command. For example, the command to "come here" may result in a task component 1141 sending a command to the autonomous navigation component 1136 to move the autonomously motile device 110 to a particular location near the user and orient the autonomously motile device 110 in a particular direction. Similar commands that do not include an explicit location and/or direction may cause the autonomously motile device 110 to move. For example, the command "go away" may result in the autonomously motile device 110 move from a room or area.

The autonomously motile device 110 may connect to the network 199 using one or more of the network interfaces 1119. In some implementations, one or more of the modules or other functions described here may execute on the processors 1104 of the autonomously motile device 110, on the server 120, or a combination thereof. For example, one or more servers 120 may provide various functions, such as ASR, natural language understanding (NLU), providing content such as audio or video to the autonomously motile device 110, and so forth.

The other components may provide other functionality, such as object recognition, speech synthesis, user identification, and so forth. The other components may comprise a speech synthesis module that is able to convert text data to human speech. For example, the speech synthesis module may be used by the autonomously motile device 110 to provide speech that a user is able to understand.

The data store 1108 may store the other data as well. For example, localization settings may indicate local preferences such as language, user identifier data may be stored that allows for identification of a particular user, and so forth.

Figure 11D:
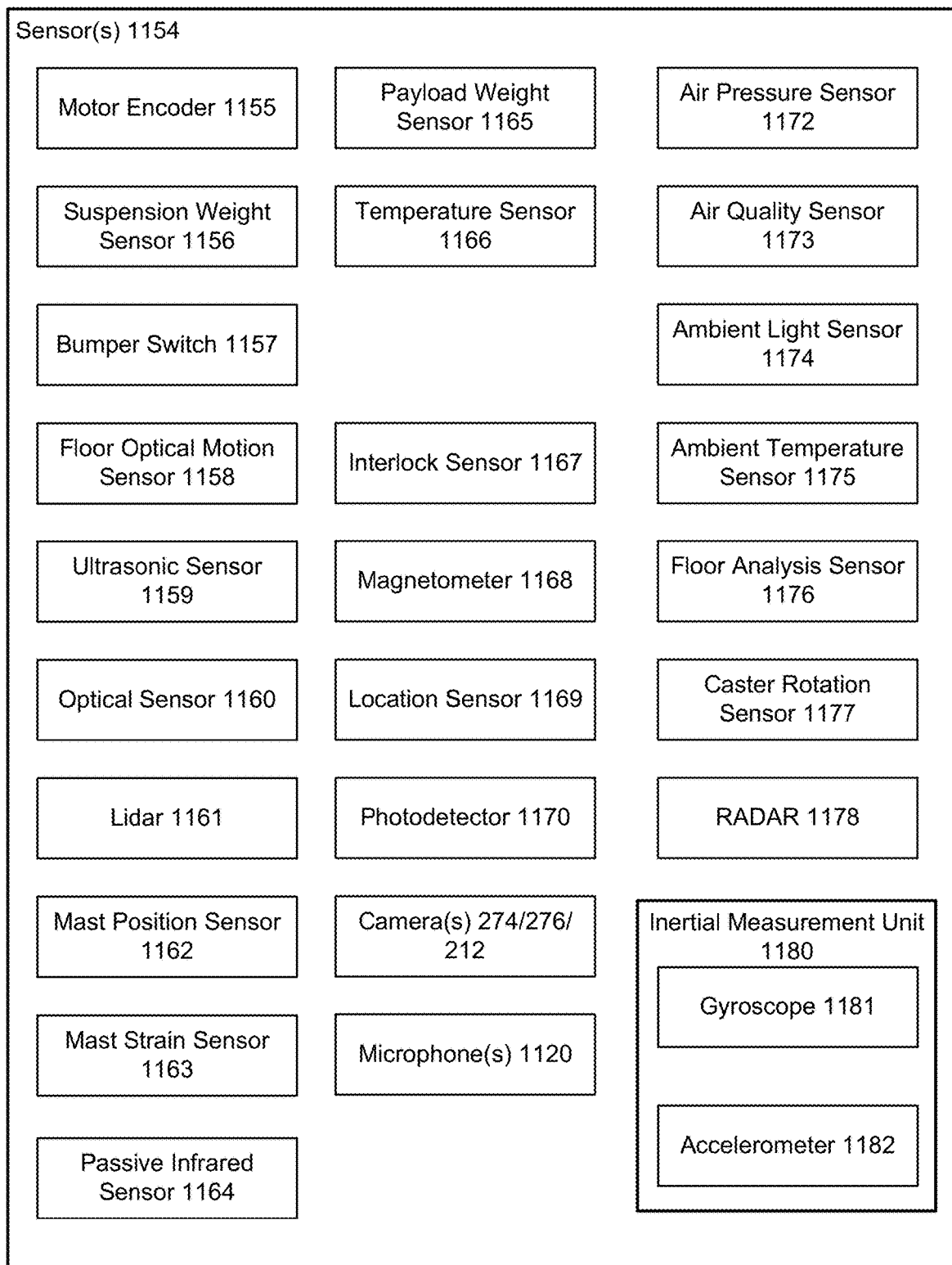
FIG. 11D illustrates sensors that may be included as part of an autonomously motile device according to embodiments of the present disclosure.

As shown in FIG. 11D, the autonomously motile device 110 may include one or more of the following sensors 1154. The sensors 1154 depicted here are provided by way of illustration and not necessarily as a limitation. It is understood that other sensors 1154 may be included or utilized by the autonomously motile device 110, while some sensors 1154 may be omitted in some configurations.

A motor encoder 1155 provides information indicative of the rotation or linear extension of a motor. The motor may comprise a rotary motor, or a linear actuator. In some implementations, the motor encoder 1155 may comprise a separate assembly such as a photodiode and encoder wheel that is affixed to the motor. In other implementations, the motor encoder 1155 may comprise circuitry configured to drive the motor. For example, the autonomous navigation component 1136 may utilize the data from the motor encoder 1155 to estimate a distance traveled.

A suspension weight sensor 1156 provides information indicative of the weight of the autonomously motile device 110 on the suspension system for one or more of the wheels or the caster. For example, the suspension weight sensor 1156 may comprise a switch, strain gauge, load cell, photodetector, or other sensing element that is used to determine whether weight is applied to a particular wheel, or whether weight has been removed from the wheel. In some implementations, the suspension weight sensor 1156 may provide binary data such as a "1" value indicating that there is a weight applied to the wheel, while a "0" value indicates that there is no weight applied to the wheel. In other implementations, the suspension weight sensor 1156 may provide an indication such as so many kilograms of force or newtons of force. The suspension weight sensor 1156 may be affixed to one or more of the wheels or the caster. In some situations, the safety component 1129 may use data from the suspension weight sensor 1156 to determine whether or not to inhibit operation of one or more of the motors. For example, if the suspension weight sensor 1156 indicates no weight on the suspension, the implication is that the autonomously motile device 110 is no longer resting on its wheels, and thus operation of the motors may be inhibited. In another example, if the suspension weight sensor 1156 indicates weight that exceeds a threshold value, the implication is that something heavy is resting on the autonomously motile device 110 and thus operation of the motors may be inhibited.

One or more bumper switches 1157 provide an indication of physical contact between a bumper or other member that is in mechanical contact with the bumper switch 1157. The safety component 1129 utilizes sensor data 1147 obtained by the bumper switches 1157 to modify the operation of the autonomously motile device 110. For example, if the bumper switch 1157 associated with a front of the autonomously motile device 110 is triggered, the safety component 1129 may drive the autonomously motile device 110 backwards.

A floor optical motion sensor (FOMS) 1158 provides information indicative of motion of the autonomously motile device 110 relative to the floor or other surface underneath the autonomously motile device 110. In one implementation, the FOMS 1158 may comprise a light source such as light-emitting diode (LED), an array of photodiodes, and so forth. In some implementations, the FOMS 1158 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 1158 may provide other information, such as data indicative of a pattern present on the floor, composition of the floor, color of the floor, and so forth. For example, the FOMS 1158 may utilize an optoelectronic sensor that may detect different colors or shades of gray, and this data may be used to generate floor characterization data. The floor characterization data may be used for navigation.

An ultrasonic sensor 1159 utilizes sounds in excess of 20 kHz to determine a distance from the sensor 1154 to an object. The ultrasonic sensor 1159 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 1159 may provide information indicative of a presence of an object, distance to the object, and so forth. Two or more ultrasonic sensors 1159 may be utilized in conjunction with one another to determine a location within a two-dimensional plane of the object.

In some implementations, the ultrasonic sensor 1159 or a portion thereof may be used to provide other functionality. For example, the emitter of the ultrasonic sensor 1159 may be used to transmit data and the detector may be used to receive data transmitted that is ultrasonic sound. In another example, the emitter of an ultrasonic sensor 1159 may be set to a particular frequency and used to generate a particular waveform such as a sawtooth pattern to provide a signal that is audible to an animal, such as a dog or a cat.

An optical sensor 1160 may provide sensor data 1147 indicative of one or more of a presence or absence of an object, a distance to the object, or characteristics of the object. The optical sensor 1160 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 1160 may utilize one or more sensing elements. For example, the optical sensor 1160 may comprise a 4×4 array of light sensing elements. Each individual sensing element may be associated with a field of view (FOV) that is directed in a different way. For example, the optical sensor 1160 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 1154 such as an image sensor or camera 274/276/212. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 1160 may operate as a depth camera, providing a two-dimensional image of a scene, as well as data that indicates a distance to each pixel.

Data from the optical sensors 1160 may be utilized for collision avoidance. For example, the safety component 1129 and the autonomous navigation component 1136 may utilize the sensor data 1147 indicative of the distance to an object in order to prevent a collision with that object.

Multiple optical sensors 1160 may be operated such that their FOV overlap at least partially. To minimize or eliminate interference, the optical sensors 1160 may selectively control one or more of the timing, modulation, or frequency of the light emitted. For example, a first optical sensor 1160 may emit light modulated at 30 kHz while a second optical sensor 1160 emits light modulated at 33 kHz.

A lidar 1161 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 1147 may be generated that is indicative of the presence of objects and the relative positions, shapes, and so forth that are visible to the lidar 1161. Data from the lidar 1161 may be used by various modules. For example, the autonomous navigation component 1136 may utilize point cloud data generated by the lidar 1161 for localization of the autonomously motile device 110 within the environment 102.

The autonomously motile device 110 may include a mast. A mast position sensor 1162 provides information indicative of a position of the mast of the autonomously motile device 110. For example, the mast position sensor 1162 may comprise limit switches associated with the mast extension mechanism that indicate whether the mast is at an extended or retracted position. In other implementations, the mast position sensor 1162 may comprise an optical code on at least a portion of the mast that is then interrogated by an optical emitter and a photodetector to determine the distance to which the mast is extended. In another implementation, the mast position sensor 1162 may comprise an encoder wheel that is attached to a mast motor that is used to raise or lower the mast. The mast position sensor 1162 may provide data to the safety component 1129. For example, if the autonomously motile device 110 is preparing to move, data from the mast position sensor 1162 may be checked to determine if the mast is retracted, and if not, the mast may be retracted prior to beginning movement.

A mast strain sensor 1163 provides information indicative of a strain on the mast with respect to the remainder of the autonomously motile device 110. For example, the mast strain sensor 1163 may comprise a strain gauge or load cell that measures a side-load applied to the mast or a weight on the mast or downward pressure on the mast. The safety component 1129 may utilize sensor data 1147 obtained by the mast strain sensor 1163. For example, if the strain applied to the mast exceeds a threshold amount, the safety component 1129 may direct an audible and visible alarm to be presented by the autonomously motile device 110.

The autonomously motile device 110 may include a modular payload bay. A payload weight sensor 1165 provides information indicative of the weight associated with the modular payload bay. The payload weight sensor 1165 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 1165 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 1165 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 1129 may utilize the payload weight sensor 1165 to determine if the modular payload bay has been overloaded. If so, an alert or notification may be issued.

One or more device temperature sensors 1166 may be utilized by the autonomously motile device 110. The device temperature sensors 1166 provide temperature data of one or more components within the autonomously motile device 110. For example, a device temperature sensor 1166 may indicate a temperature of one or more the batteries, one or more motors, and so forth. In the event the temperature exceeds a threshold value, the component associated with that device temperature sensor 1166 may be shut down.

One or more interlock sensors 1167 may provide data to the safety component 1129 or other circuitry that prevents the autonomously motile device 110 from operating in an unsafe condition. For example, the interlock sensors 1167 may comprise switches that indicate whether an access panel is open. The interlock sensors 1167 may be configured to inhibit operation of the autonomously motile device 110 until the interlock switch indicates a safe condition is present.

An inertial measurement unit (IMU) 1180 may include a plurality of gyroscopes 1181 and accelerometers 1182 arranged along different axes. The gyroscope 1181 may provide information indicative of rotation of an object affixed thereto. For example, a gyroscope 1181 may generate sensor data 1147 that is indicative of a change in orientation of the autonomously motile device 110 or a portion thereof.

The accelerometer 1182 provides information indicative of a direction and magnitude of an imposed acceleration. Data such as rate of change, determination of changes in direction, speed, and so forth may be determined using the accelerometer 1182. The accelerometer 1182 may comprise mechanical, optical, micro-electromechanical, or other devices. For example, the gyroscope 1181 in the accelerometer 1182 may comprise a prepackaged solid-state unit.

A magnetometer 1168 may be used to determine an orientation by measuring ambient magnetic fields, such as the terrestrial magnetic field. For example, the magnetometer 1168 may comprise a Hall Effect transistor that provides output compass data indicative of a magnetic heading.

The autonomously motile device 110 may include one or more location sensors 1169. The location sensors 1169 may comprise an optical, radio, or other navigational system such as a global positioning system (GPS) receiver. For indoor operation, the location sensors 1169 may comprise indoor position systems, such as using Wi-Fi Positioning Systems (WPS). The location sensors 1169 may provide information indicative of a relative location, such as "living room" or an absolute location such as particular coordinates indicative of latitude and longitude, or displacement with respect to a predefined origin.

A photodetector 1170 provides sensor data 1147 indicative of impinging light. For example, the photodetector 1170 may provide data indicative of a color, intensity, duration, and so forth.

A camera 274/276/212 generates sensor data 1147 indicative of one or more images. The camera 274/276/212 may be configured to detect light in one or more wavelengths including, but not limited to, terahertz, infrared, visible, ultraviolet, and so forth. For example, an infrared camera 274/276/212 may be sensitive to wavelengths between approximately 700 nanometers and 1 millimeter. The camera 274/276/212 may comprise charge coupled devices (CCD), complementary metal oxide semiconductor (CMOS) devices, microbolometers, and so forth. The autonomously motile device 110 may use image data acquired by the camera 274/276/212 for object recognition, navigation, collision avoidance, user communication, and so forth. For example, a pair of cameras 274/276/212 sensitive to infrared light may be mounted on the front of the autonomously motile device 110 to provide binocular stereo vision, with the sensor data 1147 comprising images being sent to the autonomous navigation component 1136. In another example, the camera 274/276/212 may comprise a 10 megapixel or greater camera that is used for videoconferencing or for acquiring pictures for the user.

The camera 274/276/212 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 274/276/212, particularly those associated with navigation or autonomous operation, may utilize a global shutter. In other implementations, the camera(s) 274/276/212 providing images for use by the autonomous navigation component 1136 may be acquired using a rolling shutter and subsequently may be processed to mitigate image artifacts.

One or more microphones 1120 may be configured to acquire information indicative of sound present in the environment 102. In some implementations, arrays of microphones 1120 may be used. These arrays may implement beamforming techniques to provide for directionality of gain. The autonomously motile device 110 may use the one or more microphones 1120 to acquire information from acoustic tags, accept voice input from users, determine a direction of an utterance, determine ambient noise levels, for voice communication with another user or system, and so forth.

An air pressure sensor 1172 may provide information indicative of an ambient atmospheric pressure or changes in ambient atmospheric pressure. For example, the air pressure sensor 1172 may provide information indicative of changes in air pressure due to opening and closing of doors, weather events, and so forth.

An air quality sensor 1173 may provide information indicative of one or more attributes of the ambient atmosphere. For example, the air quality sensor 1173 may include one or more chemical sensing elements to detect the presence of carbon monoxide, carbon dioxide, ozone, and so forth. In another example, the air quality sensor 1173 may comprise one or more elements to detect particulate matter in the air, such as the photoelectric detector, ionization chamber, and so forth. In another example, the air quality sensor 1173 may include a hygrometer that provides information indicative of relative humidity.

An ambient light sensor 1174 may comprise one or more photodetectors or other light-sensitive elements that are used to determine one or more of the color, intensity, or duration of ambient lighting around the autonomously motile device 110.

An ambient temperature sensor 1175 provides information indicative of the temperature of the ambient environment 102 proximate to the autonomously motile device 110. In some implementations, an infrared temperature sensor may be utilized to determine the temperature of another object at a distance.

A floor analysis sensor 1176 may include one or more components that are used to generate at least a portion of floor characterization data. In one implementation, the floor analysis sensor 1176 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 1176 may be used by one or more of the safety component 1129, the autonomous navigation component 1136, the task component 1141, and so forth. For example, if the floor analysis sensor 1176 determines that the floor is wet, the safety component 1129 may decrease the speed of the autonomously motile device 110 and generate a notification alerting the user.

The floor analysis sensor 1176 may include other components as well. For example, a coefficient of friction sensor may comprise a probe that comes into contact with the surface and determines the coefficient of friction between the probe and the floor.

A caster rotation sensor 1177 provides data indicative of one or more of a direction of orientation, angular velocity, linear speed of the caster, and so forth. For example, the caster rotation sensor 1177 may comprise an optical encoder and corresponding target that is able to determine that the caster transitioned from an angle of 0° at a first time to 49° at a second time.

The sensors 1154 may include a radar 1178. The radar 1178 may be used to provide information as to a distance, lateral position, and so forth, to an object.

The sensors 1154 may include a passive infrared (PIR) sensor 1164. The PIR 1164 sensor may be used to detect the presence of users, pets, hotspots, and so forth. For example, the PIR sensor 1164 may be configured to detect infrared radiation with wavelengths between 8 and 14 micrometers.

The autonomously motile device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 102 to provide landmarks for the autonomous navigation component 1136. One or more touch sensors may be utilized to determine contact with a user or other objects.

The autonomously motile device 110 may include one or more output devices. A motor (not shown) may be used to provide linear or rotary motion. A light 258 may be used to emit photons. A speaker 1121 may be used to emit sound. A display 214 may comprise one or more of a liquid crystal display, light emitting diode display, electrophoretic display, cholesteric liquid crystal display, interferometric display, and so forth. The display 214 may be used to present visible information such as graphics, pictures, text, and so forth. In some implementations, the display 214 may comprise a touchscreen that combines a touch sensor and a display 214.

In some implementations, the autonomously motile device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each.

One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the autonomously motile device 110 may include a haptic output device that provides output that produces particular touch sensations to the user. Continuing the example, a motor with an eccentric weight may be used to create a buzz or vibration to allow the autonomously motile device 110 to simulate the purr of a cat.

As noted above, multiple devices may be employed in a single system. In such a multi-device system, each of the devices may include different components for performing different aspects of the system's processing. The multiple devices may include overlapping components. The components of the autonomously motile device 110 and/or the system(s) 120 as described herein, are illustrative, and may be located as a stand-alone device or may be included, in whole or in part, as a component of a larger device or system.

Figure 13:
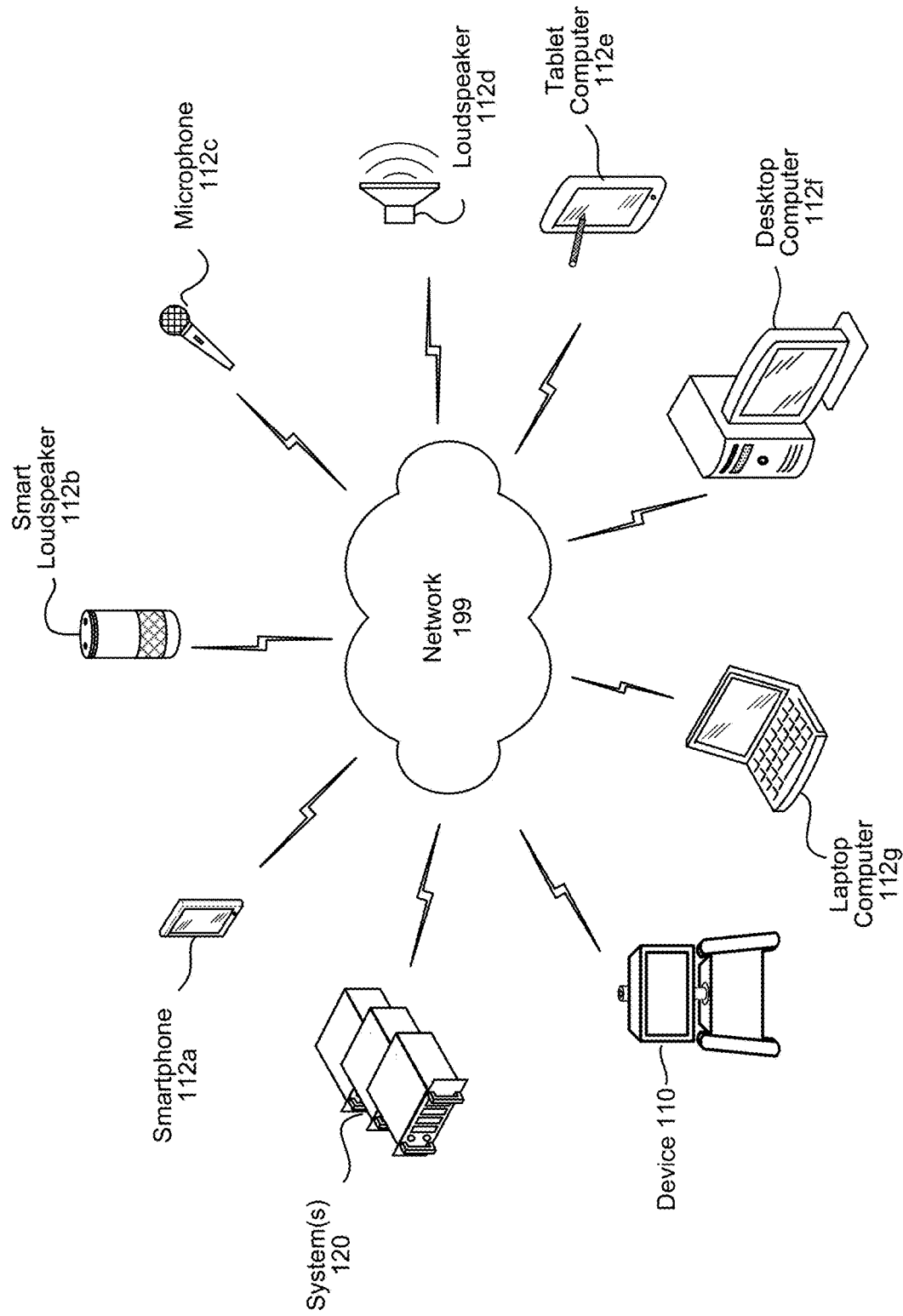
FIG. 13 illustrates a network including an autonomously motile device according to embodiments of the present disclosure.

As illustrated in FIG. 13 and as discussed herein, the autonomously motile device 110 may communicate, using the network 199, with the system 120 and/or a user device 112. The network(s) 199 may include a local or private network or may include a wide network such as the Internet. The devices may be connected to the network(s) 199 through either wired or wireless connections. Example user devices 112 include a cellular phone 112a, a smart loudspeaker 112b, a microphone 112c, a loudspeaker 112d, a tablet computer 112e, a desktop computer 112f, and a laptop computer 112g, which may be connected to the network(s) 199 through a wireless service provider, over a Wi-Fi or cellular network connection, or the like. Other devices are included as network-connected support devices, such as the system(s) 120, the skill system(s), and/or others.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end, which comprises, among other things, analog and/or digital filters (e.g., filters configured as firmware to a digital signal processor).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for controlling an autonomously motile device (AMD), the method comprising:

receiving, at a user device, audio data representing an utterance;

determining, using a first speech-processing component, that the audio data represents a command;

sending, to a second speech-processing component, first data corresponding to the command;
receiving, from the second speech-processing component, a first indication that the command corresponds to the AMD;
determining that a network connection exists between the user device and the AMD;
sending, to a device manager component of the AMD, a second indication of the network connection;
receiving, from the device manager component at the second speech-processing component, a third indication of authorization to execute the command;
sending, from the second speech-processing component to the AMD, second data corresponding to the command; and
causing the AMD to execute the command.

2. The computer-implemented method of claim 1, wherein the AMD is located in a physical environment and wherein a second AMD is also located in the physical environment, the method further comprising:
determining that the command includes reference to a location in the physical environment;
determining that the AMD is closer to the location than the second AMD; and
causing the AMD to move towards the location.

3. The computer-implemented method of claim 1, further comprising:
sending, by the first speech-processing component to the second speech-processing component, third data corresponding to a second command;
receiving, by the first speech-processing component from the second speech-processing component, a fourth indication that the command corresponds to the user device; and
performing, by the user device, an action corresponding to the second command.

4. The computer-implemented method of claim 1, further comprising:
determining, by the second speech-processing component using a natural-language understanding component, an intent associated with the command; and
determining, by the second speech-processing component that the intent corresponds to motion of the AMD in a physical environment.

5. The computer-implemented method of claim 1, further comprising:
determining, using the first speech-processing component, a response to the command; and
causing, using the user device, output corresponding to the response.

6. The computer-implemented method of claim 1, further comprising:
prior to receiving the first indication, receiving, from the second speech-processing component, a fourth indication that the command corresponds to a second AMD;
determining that no network connection exists between the user device and the second AMD; and
sending, to the device manager component, a fifth indication that no network connection exists.

7. The computer-implemented method of claim 1, further comprising:
prior to sending the first data, determining, using the user device, that the audio data includes a representation of a wakeword; and
determining that the wakeword indicates an intent to use the AMD.

8. The computer-implemented method of claim 1, further comprising:
prior to sending the first data, detecting, using the user device, a touch gesture; and
determining that the touch gesture corresponds to a user-interface element associated with the AMD.

9. The computer-implemented method of claim 1, further comprising:
prior to sending the second indication, receiving, from the AMD, first image data corresponding to a first location in an environment.

10. The computer-implemented method of claim 1, further comprising:
determining, using the first speech-processing component, that second audio data represents a second command;
sending, to the second speech-processing component, third data corresponding to the second command; and
receiving, from the second speech-processing component, a fourth indication that the second command does not correspond to the AMD.

11. A system comprising:
at least one processor; and
at least one memory including instructions that, when executed by the at least one processor, cause the system to:
receive, at a user device, audio data representing an utterance;
determine, using a first speech-processing component, that the audio data represents a command;
send, to a second speech-processing component, first data corresponding to the command;
receive, from the second speech-processing component, a first indication that the command corresponds to an autonomously motile device (AMD);
determine that a network connection exists between the user device and the AMD;
send, to a device manager component, a second indication of the network connection;
receive, from the device manager component of the AMD, a third indication of authorization to execute the command;
send, from the second speech-processing component to the AMD, second data corresponding to the command; and
cause the AMD to execute the command.

12. The system of claim 11 wherein the AMD is located in a physical environment and wherein a second AMD is also located in the physical environment and wherein the instructions, when executed by the at least one processor, further cause the system to:
determine that the command includes reference to a location in the physical environment;
determine that the AMD is closer to the location than is the second AMD; and
cause the AMD to move towards the location.

13. The system of claim 11 wherein the instructions, when executed by the at least one processor, further cause the system to:
send, by the first speech-processing component to the second speech-processing component, third data corresponding to a second command;
receive, by the first speech-processing component from the second speech-processing component, a fourth indication that the command corresponds to the user device; and perform, by the user device, an action corresponding to the second command.

14. The system of claim 11 wherein the instructions, when executed by the at least one processor, further cause the system to:
   determine, by the second speech-processing component using a natural-language understanding component, an intent associated with the command; and
   determine, by the second speech-processing component, that the intent corresponds to motion of the AMD in a physical environment.

15. The system of claim 11 wherein the instructions, when executed by the at least one processor, further cause the system to:
   determine, using the first speech-processing component, a response to the command; and
   cause, using the user device, output corresponding to the response.

16. The system of claim 11 wherein the instructions, when executed by the at least one processor, further cause the system to:
   prior to receiving the first indication, receive, from the second speech-processing component, a fourth indication that the command corresponds to a second AMD;
   determine that no network connection exists between the user device and the second AMD; and
   send, to the device manager component, a fifth indication that no network connection exists.

17. The system of claim 11 wherein the instructions, when executed by the at least one processor, further cause the system to:
   prior to sending the first data, determine, using the user device, that the audio data includes a representation of a wakeword; and
   determine that the wakeword indicates an intent to use the AMD.

18. The system of claim 11 wherein the instructions, when executed by the at least one processor, further cause the system to:
   prior to sending the first data, detect, using the user device, a touch gesture; and
   determine that the touch gesture corresponds to a user-interface element associated with the AMD.

19. The system of claim 11 wherein the instructions, when executed by the at least one processor, further cause the system to:
   prior to sending the second indication, receive, from the AMD, first image data corresponding to a first location in an environment.

20. The system of claim 11 wherein the instructions, when executed by the at least one processor, further cause the system to:
   determine, using the first speech-processing component, that second audio data represents a second command;
   send, to the second speech-processing component, third data corresponding to the second command; and
   receive, from the second speech-processing component, a fourth indication that the second command does not correspond to the AMD.

\* \* \* \* \*